(12) United States Patent
Kurashima et al.

(10) Patent No.: US 7,966,989 B2
(45) Date of Patent: Jun. 28, 2011

(54) ENGINE CONTROL APPARATUS

(75) Inventors: Yoshikuni Kurashima, Mito (JP);
Toshio Hori, Hitachinaka (JP); Hiroshi Miyamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 12/268,335

(22) Filed: Nov. 10, 2008

(65) Prior Publication Data
US 2009/0125212 A1    May 14, 2009

(30) Foreign Application Priority Data

Nov. 12, 2007  (JP) .................................. 2007-293544

(51) Int. Cl.
*F02M 57/06* (2006.01)
(52) U.S. Cl. ......... 123/297; 123/299; 123/305; 701/105
(58) Field of Classification Search ................. 123/294, 123/297, 299, 300, 305, 434, 462; 701/103, 701/104, 105
See application file for complete search history.

(56) References Cited

U.S. PATENT DOCUMENTS

| 6,058,906 A * | 5/2000 | Yoshino ........................ 123/295 |
| 6,167,863 B1 * | 1/2001 | Kazama et al. ............... 123/295 |
| 6,390,063 B1 * | 5/2002 | Obata et al. ................... 123/399 |
| 7,689,344 B2 * | 3/2010 | Kang et al. .................... 701/103 |

FOREIGN PATENT DOCUMENTS

JP    2005-155498 A    6/2005

* cited by examiner

*Primary Examiner* — John T Kwon
(74) *Attorney, Agent, or Firm* — Crowell & Moring LLP

(57) ABSTRACT

An engine control apparatus controls changeover of a combustion mode in an engine in which each cylinder has an injector that can perform fuel injection a predetermined number of times for each cylinder combustion. A control unit controls fuel injection and ignition timing from a spark plug. Upon combustion mode changeover from a first combustion mode, in which fuel injection is performed at least once for each cylinder combustion, to a second combustion mode, in which fuel injection is performed a greater number of times with a larger intake air volume than the first combustion mode, the control unit performs the steps of changing in the first combustion mode a target intake air volume required in the second combustion mode; retarding the ignition timing; changing to the second combustion mode; and further retarding the ignition timing.

8 Claims, 22 Drawing Sheets

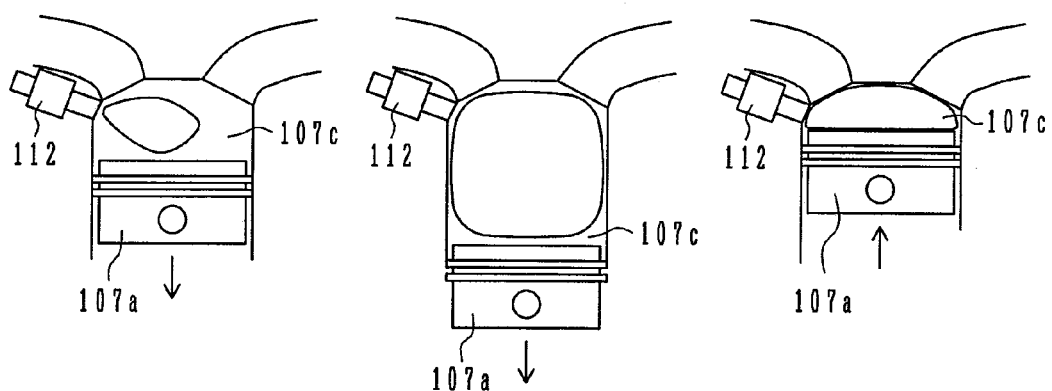
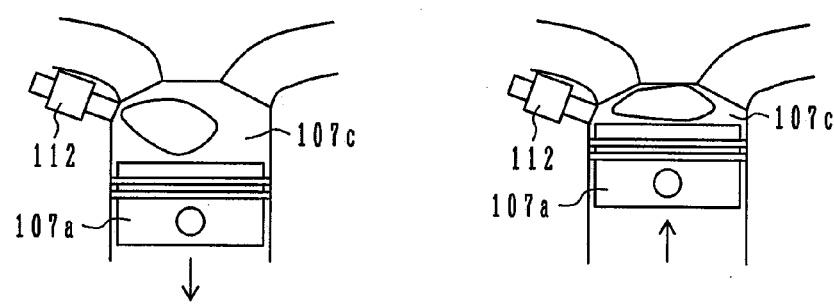

| INT | CNP | EXP | EXT | INT | CNP | EXP | EXT |
| EXT | INT | CNP | EXP | EXT | INT | CNP | EXP |
| EXP | EXT | INT | CNP | EXP | EXT | INT | CNP |
| CNP | EXP | EXT | INT | CNP | EXP | EXT | INT |

| INT | CNP | EXP | EXT | INT | CNP | EXP | EXT |
| EXT | INT | CNP | EXP | EXT | INT | CNP | EXP |
| EXP | EXT | INT | CNP | EXP | EXT | INT | CNP |
| CNP | EXP | EXT | INT | CNP | EXP | EXT | INT |

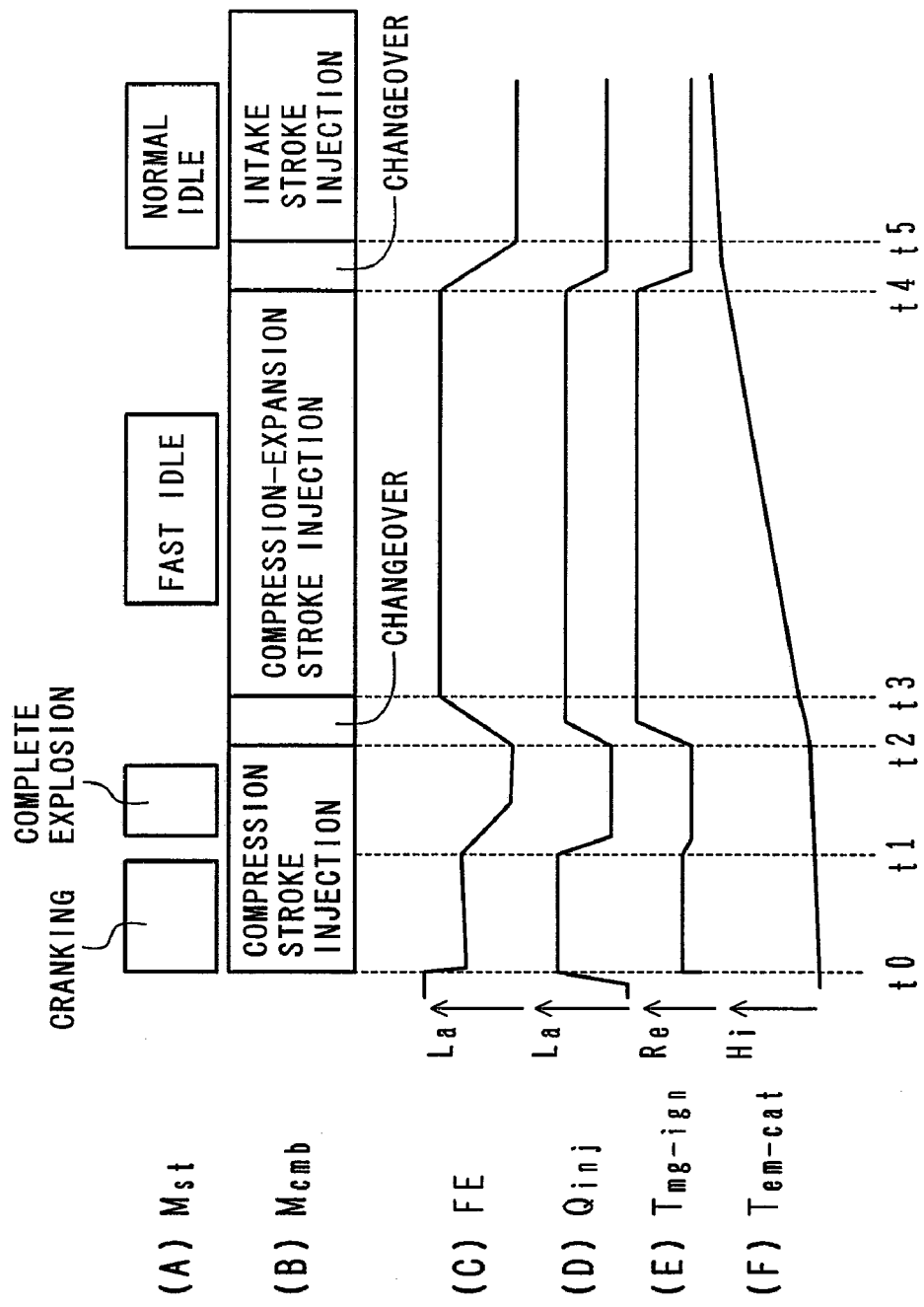

US 7,966,989 B2

ENGINE CONTROL APPARATUS

BACKGROUND OF THE INVENTION

1. Field of the Invention

The present invention relates to an engine control apparatus and more particularly to an engine control apparatus which changes the engine combustion mode and performs fuel injection plural times for each cylinder combustion.

2. Description of the Related Art

As an internal combustion engine subjected to engine combustion mode changeover control, a spark internal combustion engine which injects fuel into the combustion chamber disclosed in, for example, JP-A-2005-155498 is known. With the spark internal combustion engine, not only an injection stroke for setting the fuel injection timing but also the ignition timing is changed in relation to its starting state. Upon ignition timing changeover, the ignition timing for the injection stroke after changeover is selected through an intermediate operation period of the internal combustion engine based on an intermediate ignition timing between an ignition timing for an injection stroke before changeover and an ignition timing for an injection stroke after changeover. Specifically, the fuel injection timing is changed in relation to each combustion stroke of the engine to attain different combustion modes.

The technique disclosed in JP-A-2005-155498 restrains the level difference in the output torque of the internal combustion engine taking into consideration the ignition timing upon injection stroke changeover. As a prerequisite, the fuel injection timing is set in the compression stroke for catalyst warm-up after the internal combustion engine is started up and the ignition timing is largely retarded.

SUMMARY OF THE INVENTION

On the other hand, there is a case where fuel injection is performed plural times in each combustion for catalyst warm-up, thus attaining favorable combustion and promoting catalyst warm-up. In this case, upon injection pattern changeover, it is necessary to perform combustion pattern changeover at a time point where fuel injection can be performed plural times.

However, JP-A-2005-155498 does not disclose the fact that fuel injection is performed plural times in each combustion.

An object of the present invention is to provide an engine control apparatus that can perform combustion pattern changeover at a time point where fuel injection can be performed plural times in an engine operating state where fuel injection is performed plural times in each combustion.

In order to attain the above-mentioned object, the present invention provides an engine control apparatus used for an engine having an injector in each cylinder to perform fuel injection from the injector a predetermined number of times for each cylinder combustion, and which controls the timing of fuel injection from the injector and the ignition timing. The engine control apparatus includes control means which, upon combustion mode changeover from the first combustion mode in which fuel injection is performed at least once for each cylinder combustion to the second combustion mode in which fuel injection is performed a greater number of times with a larger intake air volume than the first combustion mode, performs the steps of changing in the first combustion mode a target intake air volume required in the second combustion mode; retarding the ignition timing; changing the second combustion mode; and further retarding the ignition timing.

In order to attain the above-mentioned object, the present invention provides an engine control apparatus used for an engine having an injector in each cylinder to perform fuel injection from the injector a predetermined number of times for each cylinder combustion to control the timing of fuel injection from the injector and the ignition timing. The engine control apparatus includes control means which, upon combustion mode changeover from the second combustion mode in which fuel injection is performed a greater number of times with a larger intake air volume than the first combustion mode to the first combustion mode in which fuel injection is performed a fewer number of times than the second combustion mode, performs the steps of changing in the second combustion mode a target intake air volume required in the first combustion mode; advancing the ignition timing; changing the first combustion mode; and further advancing the ignition timing.

The above-mentioned configuration makes it possible to perform combustion pattern changeover at a time point where fuel injection can be performed plural times in an engine operating state where fuel injection is performed plural times in each combustion.

In accordance with the present invention, combustion pattern changeover can be performed at a time point where fuel injection can be performed plural times in an engine operating state where fuel injection is performed plural times in each combustion.

BRIEF DESCRIPTION OF THE DRAWINGS

FIGS. 5A to 5C are diagrams showing a transition of the air-fuel mixture distribution when the combustion mode is changed to the intake-stroke single injection mode (hereinafter referred to as intake stroke injection mode).

FIGS. 6A and 6B are diagrams showing a transition of the air-fuel mixture distribution when the combustion mode is changed to the compression stroke single injection mode (hereinafter referred to as compression stroke injection mode).

FIGS. 13A to 13F are timing charts showing a sequence of a modification of catalyst warm-up control upon engine start-up by the engine control apparatus according to an embodiment of the present invention.

DESCRIPTION OF THE PREFERRED EMBODIMENTS

The configuration and operation of an engine control apparatus according to an embodiment of the present invention will be explained below with reference to FIGS. 1 to 25.

First, the configuration and operation of a gasoline engine system controlled by the engine control apparatus according to this embodiment will be explained below with reference to FIG. 1.

Figure 1:
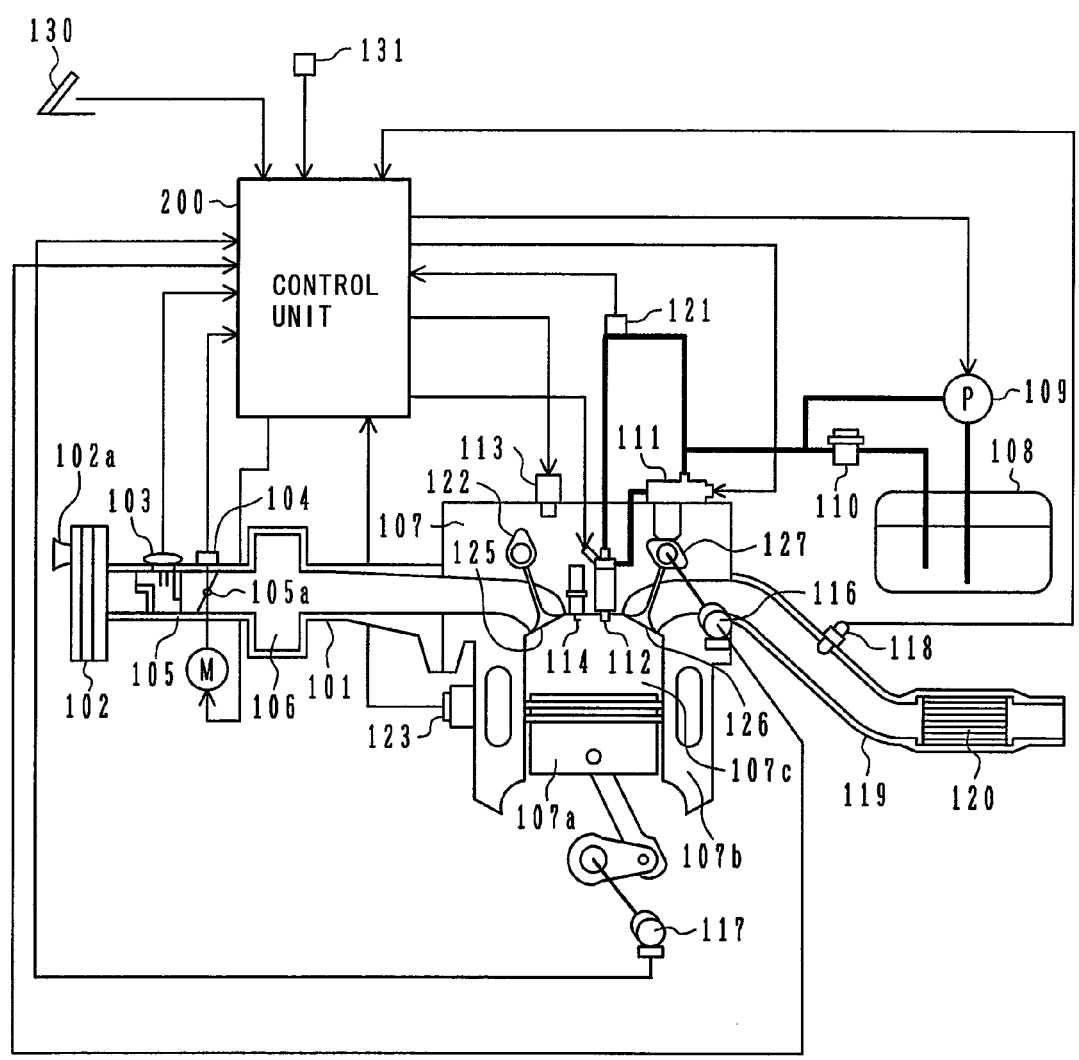
FIG. 1 is a block diagram showing the configuration of a gasoline engine system controlled by an engine control apparatus according to an embodiment of the present invention.

FIG. 1 is a block diagram showing the configuration of the gasoline engine system controlled by the engine control apparatus according to the embodiment of the present invention.

Intake air to be introduced to a cylinder 107b of a direct injection internal combustion engine 107 is taken from an entrance 102a of an air cleaner 102 into a throttle body 105. The flow rate of the intake air taken in is measured by an air flowmeter (airflow sensor) 103 which is one of internal combustion engine operating state measurement means. A signal denoting the intake flow rate measured by the airflow sensor 103 is output to a control unit 200 which is an internal combustion engine control apparatus.

An intake flow rate fed to the throttle body 105 and then input to a collector 106 is further controlled by an electric throttle valve 105a stored in the throttle body 105. The electric throttle valve 105a is driven by a motor 124. The opening angle of the electric throttle valve 105a is controlled by a drive signal of the motor 124 from the control unit 200. The throttle body 105 is provided with a throttle sensor 104 which is one of internal combustion engine operating state measurement means for detecting the opening angle of the electric throttle valve 105a. A signal of the opening angle of the electric throttle valve 105a detected by the throttle sensor 104 is output to the control unit 200.

Air suctioned by the collector 106 is distributed to each intake pipe 101 connected to the cylinder 107b of the internal combustion engine 107, and then fed to a combustion chamber 107c of the cylinder 107b.

On the other hand, fuel such as gasoline from a fuel tank 108 is primarily pressurized by a fuel pump 109 and then controlled to a fixed pressure by the fuel pressure regulator 110. Then, the fuel is secondarily pressurized to a higher pressure by a high-pressure fuel pump 111 and then transmitted by pressure to a common rail. The pressure of the fuel is detected by a fuel pressure sensor 121 and then output to the control unit 200. The high-pressure fuel transmitted by pressure to the common rail is directly injected from an injector 112 provided in the cylinder 107b into the combustion chamber 107c. The fuel injected into the combustion chamber 107c is ignited by a spark plug 114 using an ignition signal, which has been increased in voltage by an ignition coil 113.

The top portion of the cylinder 107b, where the intake pipe 101 is connected, is provided with an intake valve 125. The opening timing and closing timing of the intake valve 125 are controlled by an intake valve cam 122. Further, the top portion of the cylinder 107b, where an exhaust pipe 119 is connected, is provided with an exhaust valve 126. The opening timing and closing timing of the exhaust valve 126 are controlled by an exhaust valve cam 127. A cam angle sensor 116 is attached to the cam shaft of the exhaust valve cam 127. A signal for detecting the phase of the cam shaft detected by the cam angle sensor 116 is output to the control unit 200. Here, the cam angle sensor may be attached to the cam shaft on the side of the intake valve.

A crank angle sensor 117 is provided on the axis of the crankshaft. The rotation and phase signals of the crankshaft of the internal combustion engine detected by the crank angle sensor 117 are output to the control unit 200.

An air-fuel ratio sensor 118 provided on an upstream side of a catalyst 120 in the exhaust pipe 119 detects exhaust gas, and outputs the detected signal to the control unit 200.

The depression amount of the accelerator pedal by the driver (accelerator opening angle) is detected by an accelerator opening angle sensor 130, and output to the control unit 200.

A starter switch 131 detects that a starter motor for starting the engine is turned ON, and outputs a detection signal to the control unit 200.

The configuration and operation of the control unit 200 which is an engine control apparatus according to the present embodiment will be explained below with reference to FIG. 2.

Figure 2:
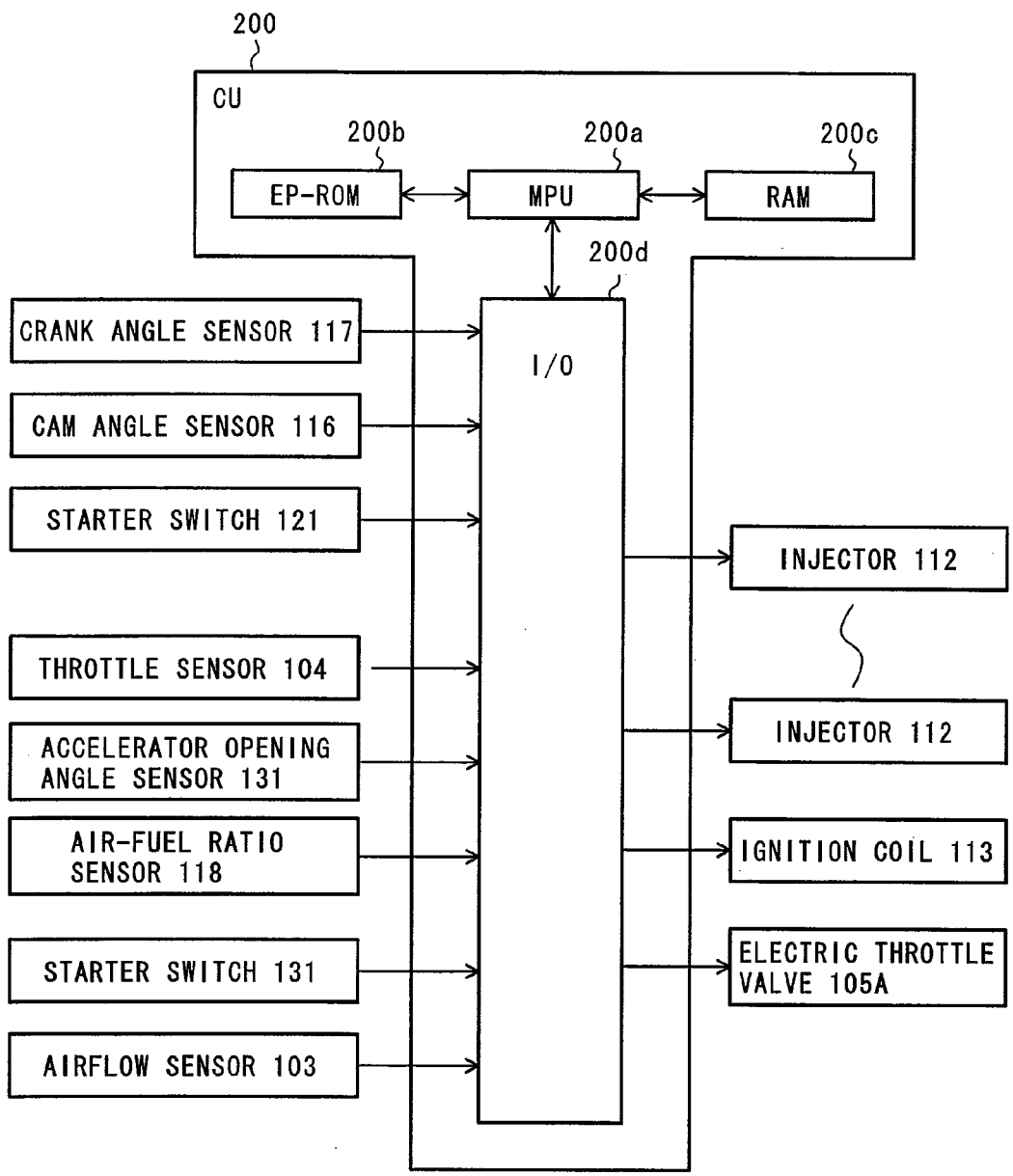
FIG. 2 is a block diagram showing the configuration of a control unit which is the engine control apparatus according to an embodiment of the present invention.
Figure 3:
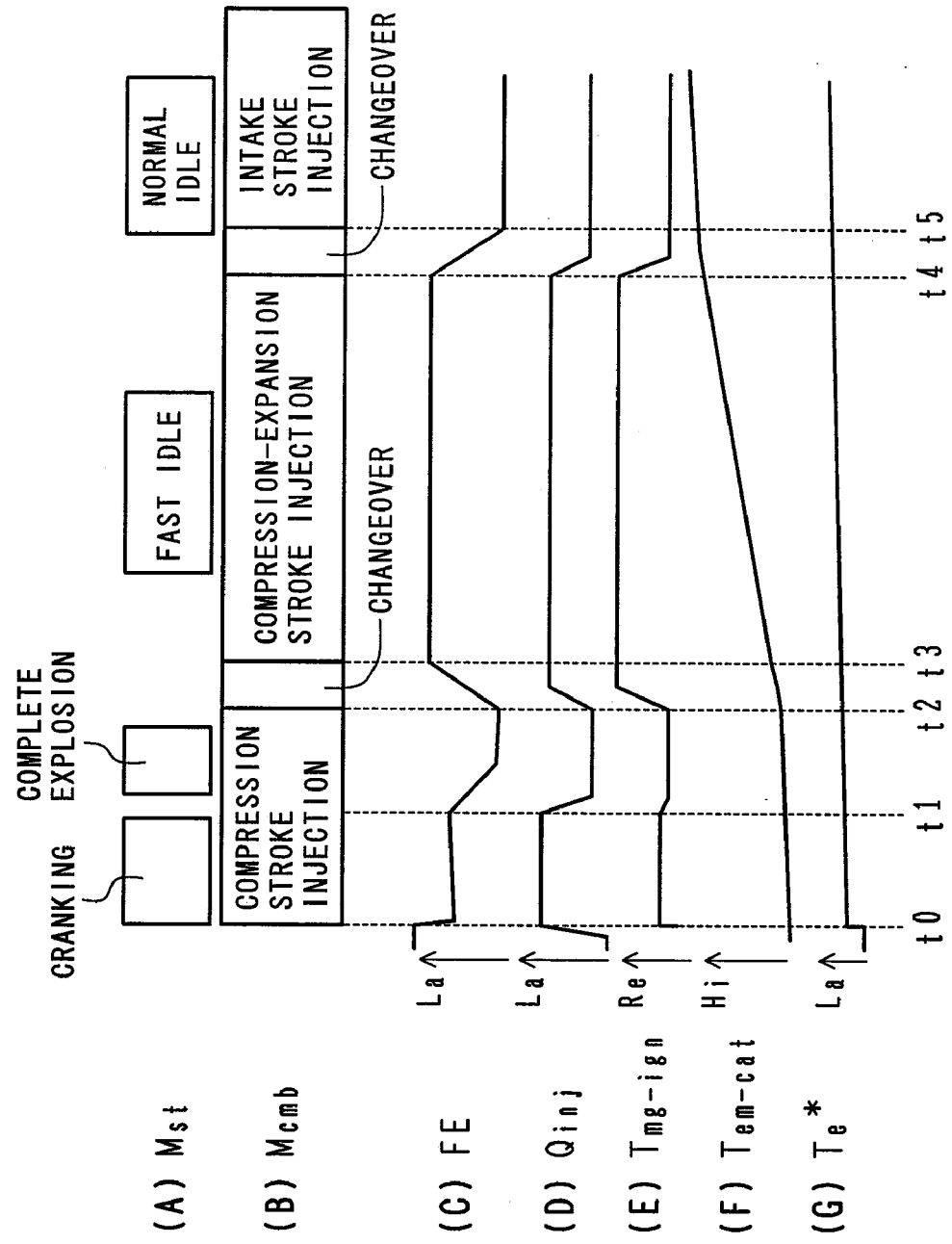
FIGS. 3A to 3G are timing charts showing the overall sequence of catalyst warm-up control upon engine start-up by the engine control apparatus according to an embodiment of the present invention.

FIG. 2 is a block diagram showing the configuration of the control unit which is an engine control apparatus according to an embodiment of the present invention. The same reference numeral denotes the same portion as that of FIG. 1.

The principal part of the control unit 200 is composed of an MPU 200*a*, a ROM 200*b*, a RAM 200*c*, and an I/O 200*d* including an A/D converter.

Signals from the crank angle sensor 117, the cam angle sensor 116, a fuel pressure sensor 112, the throttle sensor 104, the air-fuel ratio sensor 118, and the starter switch 131, which are engine operating state measurement (detection) means, are captured by the MPU 200*a* and stored in the RAM 200*c* through the I/O 200*d*. Further, a signal from the accelerator opening angle sensor 130 which is means for detecting driver's intention is captured by the MPU 200*a* and then stored in the RAM 200*c* through the I/O 200*d*.

A program for controlling the engine is stored in an EP-ROM 200*b*. The MPU 200*a* performs predetermined calculation processing based on the engine operating state stored in RAM 200*c* and driver's intention according to the engine control program stored in EP-ROM 200*b*. The MPU 200*a* outputs various control signals calculated as calculation results to the injector 112, the ignition coil 113, the electric throttle motor 124, and the like through the I/O 200*d*, and performs fuel supply quantity control, ignition timing control, and intake flow rate control.

The overall sequence of catalyst warm-up control upon engine start-up by the engine control apparatus according to the present embodiment will be explained below with reference to FIGS. 3A to 3G.

FIGS. 3A to 3G are timing charts showing the overall sequence of catalyst warm-up control upon engine start-up by the engine control apparatus according to an embodiment of the present invention.

FIG. 3A shows a starting mode Mst, and FIG. 3B a combustion mode Mcmb. FIG. 3C shows a filling efficiency FE, and the upper side of the arrow denotes larger filling efficiency. FIG. 3D shows a fuel injection quantity Qinj, and the upper side of the arrow denotes larger fuel injection quantity. FIG. 3E shows an ignition timing Tmg-ign, and the upper side of the arrow denotes the retard side of ignition timing. FIG. 3F shows a catalyst temperature Tem-cat, and the upper side of the arrow denotes higher catalyst temperature. FIG. 3G shows a required torque Te*, and the upper side of the arrow denotes larger required torque.

As shown in FIG. 3A, the engine start-up mode progresses in sequence of cranking, complete explosion, fast idle, and normal idle.

When the driver commands the engine to start with a key switch, the starter motor starts rotating. With a signal from the starter switch 131 of FIG. 2, the MPU 200 recognizes the start of the cranking mode. The engine rotates at an about 150 rpm by the starter motor. In the cranking mode, the MPU 200 injects a predetermined fuel quantity, and outputs a control signal so as to ignite the fuel at a predetermined timing.

When the engine starts rotation, the complete explosion mode is entered. With a signal from the crank angle sensor 117 of FIG. 2, the MPU 200 shifts to the complete explosion mode, for example, when the engine rotational speed exceeds 400 rpm.

When complete explosion of the engine is detected, the fast idle mode is entered and catalyst warm-up started. In the fast idle mode, the MPU 200 controls the fuel injection quantity and ignition timing and promptly raises the temperature of engine cooling water and catalyst so as to maintain high engine rotational speed such as about 1200 rpm.

For example, when the engine cooling water reaches 80 degrees Celsius, the catalyst temperature also rises and accordingly the activation of catalyst is determined, the MPU 200 usually shifts to the normal idle mode. In the normal idle mode, the MPU 200 controls the fuel injection quantity and ignition timing so as to decrease the idle rotational speed to 500 rpm or around and then continues idling.

In each of the above-mentioned modes, the accelerator pedal is not depressed by the driver and therefore constant required torque for an accelerator opening angle of 0 degrees is detected by the accelerator opening angle sensor 130, as shown in FIG. 3G. When the accelerator pedal is depressed, the fuel injection quantity and ignition timing are controlled based on the required torque associated with the accelerator opening angle at that timing, and then the traveling mode is entered.

The combustion mode will be explained below. Conventional engine start-up control uses the intake stroke injection mode in which fuel injection is performed once in the intake stroke for each cylinder combustion in each of the cranking, complete explosion, fast idle, and normal idle modes. The above-mentioned technique in JP-A-2005-155498 uses the compression stroke injection mode in which fuel injection is performed once in the compression stroke for each cylinder combustion in the fast idle mode.

The present embodiment, on the other hand, uses the compression stroke injection mode in which fuel injection is performed once in the compression stroke for each cylinder combustion in the cranking and complete explosion modes. The time period between the time points t0 and t1 of FIGS. 3A to 3G is the cranking mode, and the time period between the time points t1 and t2 is the complete explosion mode. The reason why the compression stroke injection mode is entered in the cranking and complete explosion modes will be explained later with reference to FIGS. 6A and 6B.

The fast idle mode uses the compression-expansion stroke injection mode in which fuel injection is performed once in the compression stroke and once in the expansion stroke for each cylinder combustion. The time period between the time points t2 and t3 of FIGS. 3A to 3G is the fast idle mode. The reason why the compression-expansion stroke injection mode is entered in the fast idle mode will be explained later with reference to FIGS. 7 and 8.

Similarly to conventional control, the normal idle mode uses the intake stroke injection mode in which fuel injection is performed once in the intake stroke for each cylinder combustion. A time period starting from the time point t5 of FIGS. 3A to 3G is the normal idle mode.

As mentioned later, control conditions composed of the filling efficiency, fuel injection quantity, ignition timing, etc. in the compression stroke injection mode in the complete explosion mode are largely different from control conditions composed of the filling efficiency, fuel injection quantity, ignition timing, etc. in the compression-expansion stroke injection mode in the fast idle mode. As a result, if control upon changeover from the compression stroke injection mode to the compression-expansion stroke injection mode is not suitably performed, combustion becomes unstable and there is a risk of engine stop. Then, with the present embodiment, the changeover mode is used in the time period between the time points t2 and t3 of FIGS. 3A to 3G upon changeover from the compression stroke injection mode to the compression-expansion stroke injection mode. The changeover mode will be explained later in detail with reference to FIGS. 9A and 9E.

Since combustion is likely to be unstable also upon changeover from the compression-expansion stroke injection mode in the fast idle mode to the intake stroke injection mode in the normal idle mode, the changeover mode is used in the time period between the time points t4 and t5 of FIGS. 3A to 3G. The changeover mode will be explained later in detail with reference to FIGS. 10A to 10E.

Although not shown, in each of the cranking, complete explosion, fast idle, and normal idle modes, the MPU 200 performs control so as to obtain the stoichiometric air-fuel ratio (A/F=14.7). In each of the cranking, complete explosion, and normal idle modes, it is also possible to perform control so as to obtain the weak lean air-fuel ratio rather than the stoichiometric air-fuel ratio (A/F=14.7).

Here, various combustion modes in a vehicle mounting a gasoline engine system will be explained below with reference to FIG. 4.

Figure 4:
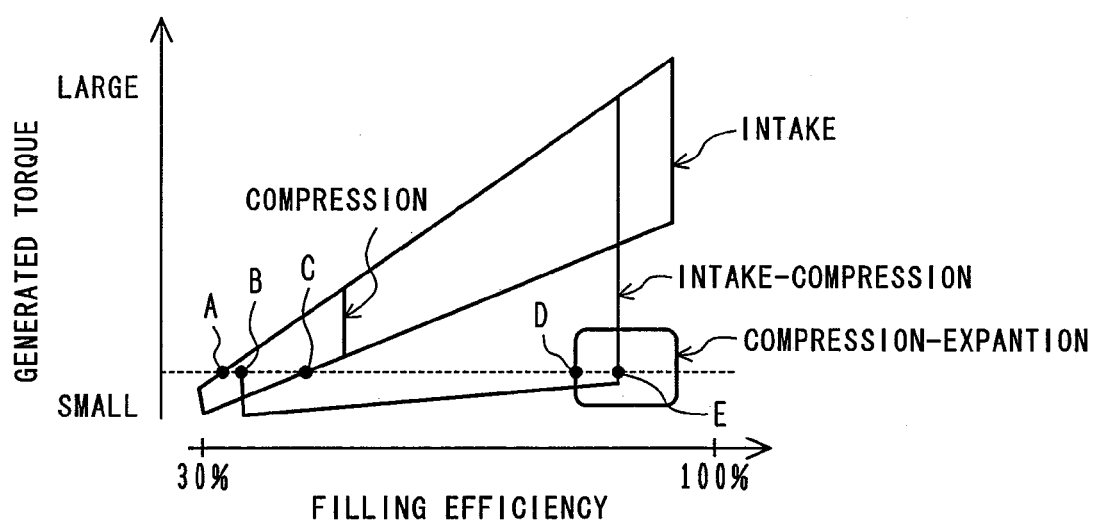
FIG. 4 is a diagram showing various combustion modes in a vehicle mounting a gasoline engine system.

FIG. 4 is a diagram showing various combustion modes in a vehicle mounting a gasoline engine system.

In FIG. 4, the horizontal axis denotes the filling efficiency which is the ratio of the actual air filling volume to the cylinder capacity. The vertical axis of FIG. 4 denotes torque generated in combustion (hereinafter referred to as generated torque).

With a spark ignition engine, it is necessary to make the ratio of air to fuel in the fuel-air mixture within a combustible region, and therefore the maximum value of generated torque is roughly determined by the filling efficiency. Here, the engine has general characteristics that retarding the ignition timing moves the maximum point of the heat generation rate to the last half of combustion resulting in the reduction of generated torque.

FIG. 4 shows a combustible region in each combustion mode: intake stroke injection, intake-compression stroke injection, compression-expansion stroke injection, and compression stroke injection. The combustion stroke in each combustion mode means that fuel injection is performed in respective combustion stroke.

The intake stroke injection mode forms approximately uniform fuel-air mixture in the combustion chamber and reveals combustion characteristics similar to intake port injection. If the ignition timing is retarded in the intake stroke injection mode, the generated torque can be reduced by a predetermined ratio with respect to a predetermined filling efficiency because of the above-mentioned action. However, if the retard quantity exceeds a predetermined value, combustion is not obtained and the combustible region is as shown in FIG. 4.

In the intake-compression stroke injection mode, an air-fuel mixture distribution suitable for combustion at retarded ignition timing can be formed in the combustion chamber, resulting in characteristics that can attain combustion even for a large retard quantity. Generated torque decreases with increasing ignition timing quantity because of the above-mentioned action. Therefore, low torque generation can be attained even under high filling efficiency conditions. Here, it is necessary to select the fuel injection quantity in the intake stroke and the fuel injection quantity in the compression stroke so as to generate an intended air-fuel mixture distribution in the combustion chamber. Further, it is necessary that the fuel injection quantity used for each combustion, i.e., the sum total of the injection quantity in the intake stroke and the injection quantity in the compression stroke be equal to a predetermined value. Therefore, the injection quantity in each stroke is represented by a division ratio of the injection quantity in each stroke to the total injection quantity.

In the compression-expansion stroke injection mode, the air-fuel mixture distribution in the combustion chamber is further stratified for intake-compression stroke injection, and combustion is obtained with a large retard quantity with a large filling efficiency. Since ignition timing is largely retarded, generated torque is small.

Although compression stroke injection has characteristics similar to those of the intake stroke injection mode, combustion is obtained only in a region having a smaller filling efficiency than the intake stroke injection mode.

The following explains the reason why the combustion mode from the cranking to complete explosion modes is changed to the compression stroke injection mode in the engine control apparatus according to the present embodiment with reference to FIGS. 5 and 6.

FIGS. 5A to 5C are diagrams showing a transition of the air-fuel mixture distribution when the combustion mode is changed to the intake stroke injection mode. FIGS. 6A and 6B are diagrams showing a transition of the air-fuel mixture distribution when the combustion mode is changed to the compression stroke injection mode. The same reference numeral denotes the same portion as that of FIG. 1.

FIGS. 5A to 5C schematically show an air-fuel mixture distribution in the combustion chamber from the first half of the intake stroke to the last half of the compression stroke when fuel injection is performed in the first half of the intake stroke.

In the intake stroke injection mode, fuel is injected from the injector 112 into the combustion chamber 107c in the first half of the intake stroke shown in FIG. 5A. FIG. 5B shows a state at the bottom dead center. FIG. 5C shows a state in the last half of the compression stroke.

In the intake stroke injection mode, fuel is injected so as to be uniformly mixed with intake air, and therefore, when the temperature of the combustion chamber wall surface is high, fuel adhering to the wall surface is also evaporated and used for combustion. However, immediately after the engine is started up, when the temperature of the combustion chamber wall surface is low, fuel adhering to the combustion chamber wall surface exists from the intake stroke to the compression stroke. Since the temperature of the wall surface is low, fuel adhering to the wall surface has not completely burned and exhausted as unburnt fuel.

On the other hand, FIGS. 6A and 6B schematically show an air-fuel mixture distribution in the combustion chamber from the middle stage to the last half of the compression stroke when fuel injection is performed in the middle stage of the compression stroke.

In the compression stroke injection mode, as shown in FIG. 6B, fuel is injected from the injector 112 into the combustion chamber 107c in the middle stage of the compression stroke. FIG. 6B shows a state in the last half of the compression stroke.

An appropriate setup of gas flow in the combustion chamber by means of a swirl generator, tumble generator, piston crown shape, etc. makes it possible to distribute and stratify the injected fuel around the spark plug in the compression stroke injection mode, as shown in FIG. 6B. Igniting at a stratified timing allows the fuel to be used for combustion without adhesion to the wall surface, thus decreasing the unburnt fuel quantity exhausted and accordingly reducing HC in exhaust gas.

Using this phenomenon, compression stroke injection is performed from the cranking to complete explosion mode, thus reducing exhaust of unburnt fuel. After the temperature of the combustion chamber wall surface exceeds a predetermined value after complete explosion, the fuel can be used for combustion also through fuel injection in the intake stroke because of the above-mentioned reason, allowing intake stroke injection to be performed. Further, since compression stroke injection is premised on an appropriate setup of gas flow in the combustion chamber as above-mentioned, it is preferable to select the combustion mode according to the operating state.

In order to enable combustion by compression stroke injection, it is necessary that the injected fuel be stratified and distributed around the spark plug. With the present embodiment shown in FIG. 1, therefore, a concave portion is provided at the crown of a piston 107a to generate a tumble flow. As a method for stratifying and distributing the injected fuel around the spark plug, it is also possible to provide a swirl valve on the intake pipe in addition to the piston crown shape of a piston to form a swirl generator for generating a swirl flow by opening and closing the swirl valve. Further, it is also possible to use a tumble generator for generating a tumble flow. Specifically, the engine system according to the present embodiment shown in FIG. 1 is provided with means for stratifying and distributing the injected fuel around the spark plug, enabling stable combustion through compression stroke injection.

Returning to FIGS. 3A to 3G, the compression stroke injection mode is used in the cranking and complete explosion modes.

In the compression stroke injection mode in the cranking mode, the engine starts rotating at a low rotational speed with cranking and therefore a slight negative pressure occurs, resulting in higher filling efficiency in comparison with the time period before cranking (before timing t0) as shown in FIG. 3C. Then, as shown in FIG. 3D, an fuel quantity associated with the air volume to be suctioned into each cylinder with this filling efficiency (the stoichiometric air-fuel ratio is obtained in relation to the intake air volume) is injected once in the compression stroke for each cylinder combustion. The ignition timing shown in FIG. 3E is an ignition timing preset for cranking.

When the complete explosion mode is entered at the time point t1, the engine starts self rotation and accordingly the rotational speed exceeds that in the cranking mode, thus increasing the negative pressure generated in the intake pipe and accordingly degrading the filling efficiency, as shown in FIG. 3C. As shown in FIG. 3D, the intake air volume suctioned into each cylinder decreases in relation to the degraded filling efficiency, thus decreasing the fuel injection quantity necessary to obtain the same stoichiometric air-fuel ratio as that in the cranking mode. This fuel is injected once in the compression stroke for each cylinder combustion. In order to increase the rising edge of the rotational speed, the ignition timing shown in FIG. 3E is slightly advanced before the time point t1.

The changeover mode between the time points t1 and t2 will be mentioned later.

Figure 7:
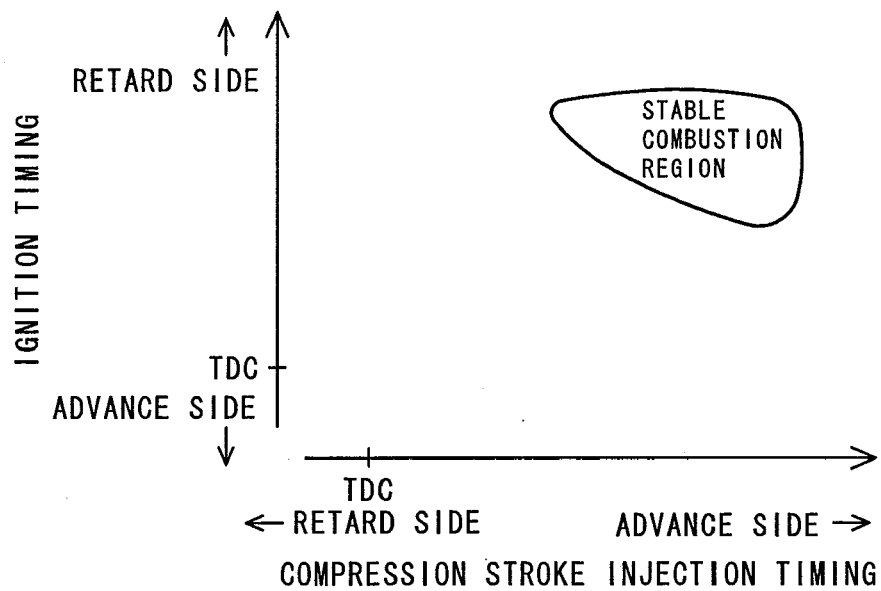
FIG. 7 is a diagram showing combustion characteristics of the compression-expansion stroke double injection mode (hereinafter referred to as compression-expansion stroke injection mode).
Figure 8:
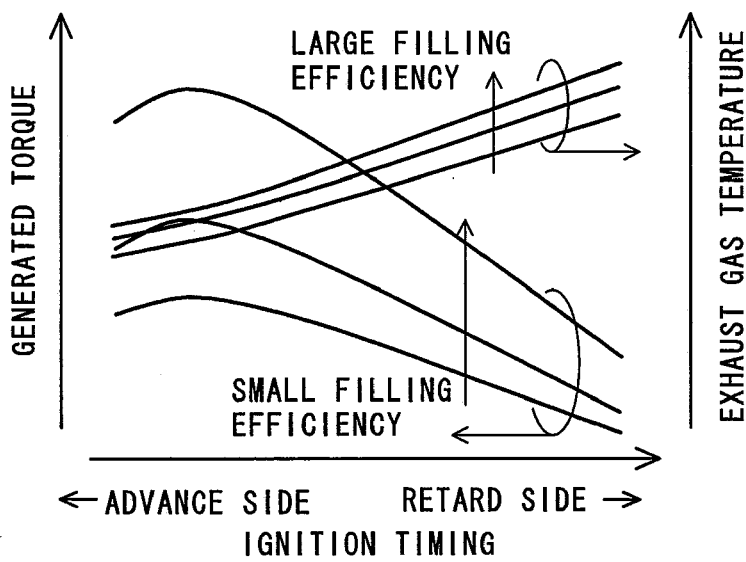
FIG. 8 is a diagram showing a relation between the ignition timing and generated torque and a relation between the ignition timing and exhaust temperature in each combustion mode.

The following explains the reason why the combustion mode in the fast idle mode is changed to the compression-expansion stroke injection mode in the engine control apparatus according to the present embodiment with reference to FIGS. 7 and 8.

FIG. 7 is a diagram showing combustion characteristics of the compression-expansion stroke injection mode. FIG. 8 is a diagram showing a relation between the ignition timing and generated torque and a relation between the ignition timing and exhaust temperature in each combustion mode.

First of all, combustion characteristics of the compression-expansion stroke injection mode will be explained below with reference to FIG. 7.

The horizontal axis of FIG. 7 denotes the compression stroke injection timing. The vertical axis of FIG. 7 denotes the ignition timing. TDC of FIG. 7 denotes the top dead center in the compression stroke. The area surrounded by a line in FIG. 7 denotes a combustible region.

Compression expansion stroke injection has a stable combustion region as shown in FIG. 7 because of the fuel-air mixture action in the combustion chamber and ignition timing adjustment with a high filling efficiency.

Slightly earlier injection timing promotes the evaporation of injected fuel and accordingly provides higher combustion stability. If the injection timing is too early, combustible fuel-air mixture does not exist around the plug at the ignition timing and therefore combustion is not obtained. In a range where combustion is obtained, the fuel injection timing is, for example, about +70 to +110 degrees from the top dead center (TDC) of the compression stroke.

If the ignition timing is on the retard side of a predetermined value, the cylinder temperature is low and combustion is not obtained. In a range where combustion is obtained, the ignition timing is, for example, about −30 to −20 degrees from the top dead center (TDC) of the compression stroke.

Further, fuel injection timing at which combustible air-fuel mixture exists around the spark plug differs according to the ignition timing.

Therefore, the stable combustion region is associated not only with the ignition timing but also with the fuel injection timing sensitivity. As a result, combustion is obtained under narrow operating conditions.

Here, it is necessary to select the fuel injection quantity in the compression stroke and the fuel injection quantity in the expansion stroke so as to generate an intended air-fuel mixture distribution in the combustion chamber, like the above-mentioned intake-compression stroke injection mode. Further, since it is demanded that the sum total of the fuel injection quantity used for each combustion be a predetermined value, the injection quantity in each stroke is represented by the division ratio of the injection quantity in each stroke to the total injection quantity.

A relation between the ignition timing and generated torque and a relation between the ignition timing and exhaust temperature in each combustion mode will be explained below with reference to FIG. 8. In FIG. 8, the horizontal axis denotes ignition timing, and the left-hand side vertical axis generated torque.

Under a condition of a predetermined air-fuel ratio, there is an ignition timing at which generated torque is maximized for a predetermined filling efficiency, and the generated torque decreases as ignition timing is retarded. Since the maximum value of the generated torque is approximately proportional to the filling efficiency, the generated torque increases with increasing filling efficiency as shown in FIG. 8.

On the other hand, with increasing filling efficiency, the heat generation quantity increases and accordingly the exhaust temperature rises.

The characteristics shown in FIG. 8 are common to each combustion mode: intake stroke injection, intake-compression stroke injection, compression-expansion stroke injection, and compression stroke injection. However, the generated torque and the absolute value of the exhaust temperature assigned to the vertical axes differ for each combustion mode.

Here, as ignition timing is retarded, the efficiency of conversion of supplied fuel to generated torque decreases and therefore excessive energy is used to raise the exhaust temperature. Accordingly, the exhaust temperature rises as the ignition timing is retarded.

On the other hand, the exhaust gas conversion function of the catalyst works when the catalyst temperature is in a predetermined high temperature state. Therefore, in order to early make catalyst warm-up immediately after the engine is started up to obtain the activation of the catalyst in the early stage, it is effective to supply exhaust gas having high exhaust temperature.

The ignition timing is shifted to the retard side to obtain slightly high exhaust temperature. Combustion modes in which the ignition timing is shifted to the retard side to enable combustion are the compression-expansion stroke injection and intake-compression stroke injection modes.

Therefore, in order to early obtain the high catalyst conversion function immediately after the engine is started up, it is necessary to perform compression-expansion stroke injection or intake-compression stroke injection that can supply high exhaust temperature through retarded ignition timing. With the present embodiment, compression-expansion stroke injection is performed to obtain high exhaust temperature prior to catalyst warm-up.

Returning to FIGS. 3A to 3G, when the fast idle mode is entered at the time point t2, the compression-expansion stroke injection mode is entered. However, as shown in FIG. 8, high filling efficiency is necessary to increase ignition timing retard in the compression-expansion stroke injection mode.

Therefore, as shown in FIG. 3C, the filling efficiency is set to a high value. As shown in FIG. 3D, the intake air volume suctioned into each cylinder increases in relation to the high filling efficiency, thus increasing the fuel injection quantity necessary to obtain the same stoichiometric air-fuel ratio as that in the cranking mode. This fuel is injected once in the compression stroke and once in the expansion stroke (twice in total) for each cylinder combustion. The fuel injection quantity shown in FIG. 3D is the sum total of the fuel injection quantity in the compression stroke and the fuel injection quantity in the expansion stroke. The ignition timing shown in FIG. 3E is largely retarded because of the above-mentioned reason.

The filling rate is low in compression stroke injection in the complete explosion mode, and the filling rate is high in the compression-expansion stroke injection mode in the fast idle mode in FIGS. 3A to 3G. Therefore, in the changeover mode, it becomes necessary to connect low and high filling efficiencies while maintaining the same torque.

In FIGS. 3A to 3G, when catalyst warm-up is completed by the fast idle mode, the common intake stroke injection mode is immediately re-entered in the normal idle mode. In this case, it becomes necessary to connect high and low filling efficiencies while maintaining the same torque in the changeover mode.

The following explains a changeover mode for transition from the compression stroke injection mode to the compression-expansion stroke injection mode with the engine control apparatus according to the present embodiment with reference to FIGS. 9A and 9E.

FIGS. 9A to 9E are timing charts showing a changeover mode for transition from the compression stroke injection mode to the compression-expansion stroke injection mode by the engine control apparatus according to an embodiment of the present invention.

FIGS. 9A to 9E show in detail a changeover mode for transition from the compression stroke injection mode to the compression-expansion stroke injection mode shown in FIGS. 3A to 3G. FIG. 9A shows the starting mode Mst, and FIG. 9B the combustion mode Mcmb. FIG. 9C' shows the intake air volume Qa, and the upper side of the arrow denotes larger intake air volume. The intake air volume is proportional to the filling efficiency shown in FIG. 3C. FIG. 9D shows the fuel injection quantity Qinj, and the upper side of the arrow denotes larger fuel injection quantity. FIG. 9E shows an ignition timing Tmg-ign, and the upper side of the arrow denotes the retard side of ignition timing.

The time period between the time points t2 and t3 of FIGS. 9A to 9E is equivalent to the changeover mode shown in FIG. 3B.

The intake air volume flowing into each cylinder is controlled by the opening of the throttle valve 105a shown in FIG. 1. The opening of the throttle valve is controlled by the engine control unit 200.

However, even if the throttle valve instantly opens and closes, the intake air volume flowing into each cylinder cannot be suddenly changed because of response characteristics of the collector 106 disposed between the throttle valve and the combustion chamber. Specifically, when the throttle valve is opened, the air that has flowed in through the throttle valve fills up the collector having a predetermined capacity, and then flows into the combustion chamber 107c afterwards. Therefore, when the target air volume shown by the dashed line is increased stepwise at the time point t2 as shown in FIG. 9C', the throttle valve first operates with a response delay $\Delta t1$. Then, in accordance with response characteristics of the collector, the air volume flowing into each cylinder gradually increases as shown by the solid line of FIG. 9C'.

Therefore, it is not possible to make an instant transition from a combustion requiring a small intake air volume for example in the compression stroke injection mode to a combustion requiring a large intake air volume for example in the compression-expansion stroke injection mode.

With the present embodiment as shown by the solid line of FIG. 9C', the engine power torque required in the fast idle mode is attained by retarding the ignition timing in the process of gradually increasing the intake air volume, thus attaining combustion changeover.

Specifically, as shown in FIG. 4, compression stroke injection has a combustible region only in the low filling efficiency range, and the compression-expansion stroke injection mode has a combustible region only in the high filling efficiency range. On the other hand, the intake-compression stroke injection mode has a combustible region over a wide filling efficiency range from low to high filling efficiencies. Therefore, intake-compression stroke injection is used during changeover from the compression stroke injection mode to the compression-expansion stroke injection mode. In the intake-compression stroke injection mode, however, if the filling efficiency is gradually increased from low to high filling efficiencies, the generated torque increases as shown in FIG. 8. During changeover from the compression stroke injection mode through the intake-compression stroke injection mode to the compression-expansion stroke injection mode, the accelerator pedal is not depressed and the accelerator opening angle remains 0 degrees, resulting in constant required torque. Then, in the intake-compression stroke injection mode, in order to give constant required torque while gradually increasing the filling efficiency from low to high filling efficiencies, the ignition timing is retarded, as explained with FIG. 8. Specifically, an increase in the output torque generated by an increased intake air volume is canceled by retarding the ignition timing, thus attaining the required torque.

Then, the combustion mode is changed when the intake air volume reaches the quantity required by compression-expansion stroke injection.

In each of the series of combustion modes, it is necessary to obtain a predetermined (stoichiometric) target air-fuel ratio in order to attain favorable combustion and extremely low exhaust gas hazardous component, for example, hydrocarbon and the like. Therefore, the fuel supply quantity is proportional to the intake air volume.

On the other hand, in the intake-compression stroke injection mode, fuel injection is performed once in the intake stroke and once in the compression stroke (twice in total), the injector has a minimum injectable fuel quantity.

Specifically, the fuel injection quantity of the injector is controlled by the valve opening angle time when a drive injection pulse width is given. If the injection pulse width becomes smaller than a predetermined value, the valve action becomes unstable resulting in an unstable fuel injection quantity. Therefore, there is a lower limit in the adjustable range of the fuel injection quantity. Therefore, in order to attain a desired fuel injection quantity in the intake-compression stroke injection mode, it is necessary that the intake air volume be larger than a predetermined value. Clearly, the intake air volume is larger than that in the intake stroke injection mode. Further, it is generally clear that the larger the number of fuel injections performed in each combustion, the larger becomes the necessary air volume.

As shown in FIGS. 9A to 9E, after complete explosion of the engine at the time point t2, various conditions are satisfied and then the combustion mode changeover to the compression-expansion stroke injection mode is determined. The target value of the throttle valve opening angle is rapidly increased as shown by the dashed line of FIG. 9C' so as to use the target intake air volume as a target air volume for the intake-compression stroke injection mode. In response to the target value, the actual intake air volume gradually increases as shown by the solid line of FIG. 9C' accompanying the above-mentioned retard.

Since the engine torque increases with increasing air volume, the ignition timing is gradually retarded with increasing intake air volume as shown in FIG. 9E to cancel the increase in torque, thus attaining target constant engine torque.

During the time period between the time points t2 and t2-1, the compression stroke injection mode at complete explosion is maintained, and the number of fuel injections performed in each combustion remains one. Specifically, although the fuel injection quantity increases with increasing intake air volume, the fuel injection quantity is supplied with single fuel injection. The ignition timing retard quantity remains in a range where combustion is obtained.

At the time point t2-1, when the intake air volume exceeds a predetermined value Qa1, the intake-compression stroke injection mode is entered. The intake air volume Qa1 is an air volume that can supply the required fuel quantity even if fuel injection is performed twice.

In the present embodiment, the target air-fuel ratio for compression stroke injection is the weak lean air-fuel ratio rather than the stoichiometric air-fuel ratio, and that for intake-compression stroke injection is the stoichiometric air-fuel ratio. In order to select a rich air-fuel ratio with the identical intake air volume, the fuel injection quantity is increased stepwise as shown in FIG. 9C'. Further, in order to cancel an increase in the output torque accompanying the rich air-fuel ratio, the ignition timing is retarded stepwise as shown in FIG. 9E. Specifically, a change of the air-fuel ratio is associated with a change of ignition timing to attain target engine power.

During the time period between the time points t2-1 and t3, the intake air volume gradually increases as shown in FIG. 9C' accompanying the above-mentioned retard. In order to cancel the increase in the output torque accompanying the increased air volume, the ignition timing is retarded as shown in FIG. 9E.

At the time point t3, the intake air volume reaches a target value Qa2 for intake-compression stroke injection. With the intake air volume Qa2, the combustible region is reached in the compression-expansion stroke injection mode. At the time point t3, the compression-expansion stroke injection mode is entered. The target intake air volume shifts to a target value of compression-expansion stroke injection stepwise as shown by the dashed line of FIG. 9C', and the actual intake air volume follows the target value with a retard as shown by the solid line of FIG. 9C'. With the increase in the air volume, the fuel injection quantity increases as shown in FIG. 9D. The fuel injection quantity shown in FIG. 9D denotes the total fuel injection quantity for each cylinder combustion, and, in the case of compression-expansion stroke injection, the total fuel injection quantity in the compression stroke and the fuel injection quantity in the expansion stroke. In order to cancel the increase in the output torque accompanying the increased air volume, the ignition timing is retarded as shown in FIG. 9E.

At the time point t3, the target air-fuel ratio changes from the stoichiometric air-fuel ratio to the weak lean air-fuel ratio, and therefore the fuel injection quantity and ignition timing are changed in reverse of those at the time point t2-1, that is, each decreased stepwise.

Although the weak lean air-fuel ratio is selected in the compression stroke injection mode, the stoichiometric air-fuel ratio is selected in the intake-compression stroke injection mode, and the weak lean air-fuel ratio is selected again in the compression-expansion stroke injection mode in the above explanation, it is also possible to select the stoichiometric air-fuel ratio in all of the compression stroke injection mode, intake-compression stroke injection mode, and compression-expansion stroke injection mode. In this case, neither fuel injection quantity nor ignition timing changes stepwise at the time points t2-1 and t3.

The following explains a process of changeover from the compression stroke injection mode to the compression-expansion stroke injection mode through the intake-compression stroke injection mode with reference to the graph of FIG. 4. In FIG. 4, the dashed line indicates that the generated torque is constant. Before the time point t2 of FIGS. 9A and 9E, compression stroke injection is performed. For example, combustion is obtained under a condition of a point A of FIG. 4. During the time period between the time points t2 and t2-1 of FIGS. 9A and 9E, compression stroke injection is performed. From points A to B of FIG. 4, the ignition timing is retarded while increasing the intake air volume to maintain constant generated torque under varying combustion conditions.

At the time point t2-1, the combustion range enables intake-compression stroke injection and therefore the intake-compression stroke injection mode is entered as shown in FIG. 9B.

During the time period between the time points t2-1 and t3 of FIGS. 9A and 9E, intake-compression stroke injection is performed. From points B to D of FIG. 4, the ignition timing is retarded while increasing the intake air volume to maintain constant generated torque under varying combustion conditions.

At the time point t3, the combustion range enables compression-expansion stroke injection and therefore the compression-expansion stroke injection mode is entered as shown in FIG. 9B.

In this way, the combustion mode can be changed from the compression stroke injection mode to the compression-expansion stroke injection mode while maintaining constant generated torque.

The present embodiment is characterized in that the intake-compression stroke injection mode is entered in the course of changeover from the compression stroke injection mode to the compression-expansion stroke injection mode. The present invention is characterized also in that, upon combustion mode changeover from the first combustion mode (compression stroke injection mode) in which fuel injection is performed at least once for each cylinder combustion to the second combustion mode (intake-compression stroke injection mode) in which fuel injection is performed a greater number of times with a larger intake air volume than the first combustion mode, control means performs the steps of changing in the first combustion mode (compression stroke injection mode) a target intake air volume required in the second combustion mode (intake-compression stroke injection mode); retarding the ignition timing; changing the second combustion mode (intake-compression stroke injection mode); and further retarding the ignition timing.

In this way, the combustion mode can be changed from the compression stroke injection mode to the compression-expansion stroke injection mode while maintaining desired torque (constant torque).

If the engine cooling water temperature is low, for example, 0 degree Celsius or lower upon engine start-up, the engine is started up in the intake stroke injection mode. As shown in FIG. 4, the combustible region in the compression stroke injection mode overlaps with that in the intake stroke injection mode, and the conventional engine start-up sequence is performed in the intake stroke injection mode. Therefore, the intake stroke injection mode can be used instead of the compression stroke injection mode. However, as explained in FIGS. 6A and 6B, the intake stroke injection mode makes it impossible to obtain the effect of reducing HC in exhaust gas in comparison with the compression stroke injection mode. Even when the engine is started up in the intake stroke injection mode, the same fuel injection quantity control and ignition timing control as those shown in FIGS. 9A and 9E are performed if the fast idle mode is used as the compression-expansion stroke injection mode.

The following explains a changeover mode for transition from the compression-expansion stroke injection mode to the intake stroke injection mode by the engine control apparatus according to the present embodiment with reference to FIGS. 10A to 10E.

FIGS. 10A to 10E are timing charts showing a changeover mode for transition from the compression-expansion stroke injection mode to the intake stroke injection mode by the engine control apparatus according to an embodiment of the present invention.

FIGS. 10A to 10E show in detail a changeover mode for transition from the compression-expansion stroke injection mode to the intake stroke injection mode shown in FIGS. 3A to 3G. FIG. 10A shows the starting mode Mst, and FIG. 10B the combustion mode Mcmb. FIG. 10C' shows the intake air volume Qa, and the upper side of the arrow denotes larger intake air volume. The intake air volume is proportional to the filling efficiency shown in FIG. 3C. FIG. 10D shows the fuel injection quantity Qinj, and the upper side of the arrow denotes larger fuel injection quantity. FIG. 10E shows an ignition timing Tmg-ign, and the upper side of the arrow denotes the retard side of ignition timing.

The time period between the time points t4 and t5 of FIGS. 9A to 9E is equivalent to the changeover mode shown in FIG. 3B.

With the present embodiment, the combustion mode is changed basically in reverse order of the process of FIGS. 9A and 9E.

At the time point t4, if the end of catalyst warm-up is judged from the cooling water temperature or the like, the end of the compression-expansion stroke injection mode is judged. As shown by the dashed line of FIG. 10C', the target intake air volume is changed to a small value for intake-compression stroke injection.

During the time period between the time points t4 and t4-1, the ignition timing is advanced as shown in FIG. 10E in relation to the decreasing intake air volume as shown by the solid line of FIG. 10C' while maintaining the compression-expansion stroke injection mode.

At the time point t4-1, the intake air volume reaches the target value for intake-compression stroke injection shown by the dashed line of FIG. 10C' and therefore the combustion mode is changed to the intake-compression stroke injection mode as shown in FIG. 10B. Here, the target air-fuel ratio changes from the weak lean to stoichiometric air-fuel ratios, resulting in the same total fuel injection quantity and ignition timing as those at the time point t2-1 of FIGS. 9A and 9E, that is, each changes stepwise. At the same time, the target intake air volume is changed stepwise for the usual intake stroke injection mode, as shown by the dashed line of FIG. 10C'.

During the time period between the time points t4-1 and t4-2, the ignition timing is advanced in relation to the decreasing intake air volume while maintaining the intake-compression stroke injection mode. During this time period, the intake air volume is at least a predetermined value and therefore a required fuel quantity can be supplied even if intake-compression stroke injection is performed.

At the time point t4-2, the ignition timing is retarded within the combustible region in the intake stroke injection mode, resulting in a range of the intake air volume that can attain required output torque. At the time point t4-2 and later, the intake stroke injection mode is entered, and the ignition timing is advanced with decreasing intake air volume; at the time point t5, the changeover process is completed, as shown in FIG. 10B.

Although the weak lean air-fuel ratio is selected in the compression-expansion stroke injection mode, the stoichiometric air-fuel ratio is selected in the intake-compression stroke injection mode, and the weak lean air-fuel ratio is selected again in the compression stroke injection mode in the above explanation, it is also possible to select the stoichiometric air-fuel ratio in all of the compression-expansion stroke injection mode, intake-compression stroke injection mode, and compression stroke injection mode. In this case, neither fuel injection quantity nor ignition timing changes stepwise at the time point t4-1.

The following explains a process of changeover from the compression-expansion stroke injection mode to the compression stroke injection mode through the intake-compression stroke injection mode with reference to the graph of FIG. 4. In FIG. 4, the dashed line indicates that the generated torque is constant. In FIGS. 10A to 10E, before the time point t4-1, compression-expansion stroke injection is performed. At the time point t4-1, combustion is obtained under a condition of a point E of FIG. 4 allowing combustion mode changeover from the compression-expansion stroke injection mode to the intake-compression stroke injection mode.

During the time period between the time points t4-1 and t4-2 of FIGS. 10A to 10E, intake-compression stroke injection is performed. From points E to C of FIG. 4, the ignition timing is advanced while decreasing the intake air volume to maintain constant generated torque under varying combustion conditions.

At the time point t4-2, the combustion range enables intake stroke injection and therefore the intake stroke injection mode is entered as shown in FIG. 10B.

In this way the combustion mode can be changed from the compression-expansion stroke injection mode to the intake stroke injection mode while maintaining constant generated torque.

The present embodiment is characterized in that the intake-compression stroke injection mode is entered in the course of changeover from the compression stroke injection mode to the intake stroke injection mode. The present invention is characterized also in that, upon combustion ode changeover from the second combustion mode (compression-expansion stroke injection mode) in which fuel injection is performed a greater number of times with a larger intake air volume than the first combustion mode to the first combustion mode (intake stroke injection mode) in which fuel injection is performed a fewer number of times than the second combustion mode, control means performs the steps of changing in the second combustion mode (compression-expansion stroke injection mode) a target intake air volume required in the first combustion mode (intake stroke injection mode); advancing the ignition timing; changing the first combustion mode (intake stroke injection mode); and further advancing the ignition timing.

The exhaust emission performance obtained by the engine control apparatus according to the present embodiment will be explained below with reference to FIG. 11.

Figures 11, 12A, 12B:
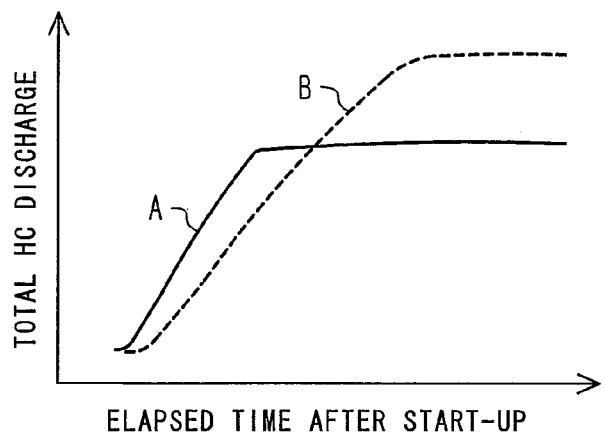
FIG. 11 is a diagram showing the exhaust emission performance obtained by the engine control apparatus according to an embodiment of the present invention.
FIGS. 12A and 12B are diagrams showing fuel injection patterns upon combustion mode changeover by the engine control apparatus according to an embodiment of the present invention.

FIG. 11 is a diagram showing the exhaust emission performance obtained by the engine control apparatus according to an embodiment of the present invention.

In FIG. 11, the horizontal axis denotes the elapsed time after the engine is started up, and the vertical axis an integrated value of hydrocarbon (HC) discharge quantity after the engine is started up. A solid line A denotes the integrated value of hydrocarbon (HC) discharge quantity when catalyst warm-up is performed by the present embodiment. A dashed line B denotes the integrated value of hydrocarbon (HC) discharge quantity when catalyst warm-up is performed by conventional intake stroke injection.

Since the intake air volume is increased in the intake-compression stroke injection and compression-expansion stroke injection modes, the hydrocarbon discharge quantity in the present embodiment is larger than that in a conventional case until the catalyst is activated, as shown by the solid line A. However, since the present embodiment obtains catalyst activation earlier than the conventional case, the total hydrocarbon discharge quantity of the present embodiment (dashed line A) can be made smaller than that of the conventional case (dashed line B).

Fuel injection patterns upon combustion mode changeover by the engine control apparatus according to the present embodiment will be explained below with reference to FIGS. 12A and 12B.

FIGS. 12A and 12B are diagrams showing fuel injection patterns upon combustion mode changeover by the engine control apparatus according to an embodiment of the present invention.

FIG. 12A shows the transition from the intake-compression stroke injection mode to the compression-expansion stroke injection mode at the time point t3 of FIGS. 9A and 9E. Time progresses from left to right. This example applies to a 4-cylinder engine. The first cylinder, second cylinder, third cylinder, and fourth cylinder are shown from the top downward. Each cylinder repeats the intake stroke (INT), compression stroke (CMP), expansion stroke (EXP), and exhaust stroke (EXT). The position of each vertical shaded bar denotes a fuel injection timing.

In the first combustion, the first cylinder performs intake-compression stroke injection, and the second and subsequent cylinders perform compression-expansion stroke injection. In the following combustion, the first cylinder also transits to the compression-expansion stroke injection mode.

FIG. 12B shows transition from the compression-expansion stroke injection mode to the intake-compression stroke injection mode at the time point t4-1 of FIGS. 10A to 10E. Time progresses from left to right. This example applies to a 4-cylinder engine. The first cylinder, second cylinder, third cylinder, and fourth cylinder are shown from the top downward. Each cylinder repeats the intake stroke (INT), compression stroke (CMP), expansion stroke (EXP), and exhaust stroke (EXT). The position of each vertical shaded bar denotes a fuel injection timing.

In the first combustion, the first and second cylinders perform compression-expansion stroke injection, and the third and fourth cylinders perform intake-compression stroke injection. In the following combustion, the first and second cylinders also transit to the intake-compression stroke injection mode.

As mentioned above, it is necessary to supply the total required fuel quantity through two fuel injections for each combustion. Therefore, a target fuel injection quantity can be obtained through two fuel injections in the intake-compression stroke injection and compression-expansion stroke injection modes.

Further, because of early phase of fuel injection in the intake stroke, intake stroke injection may be counterchanged with compression-expansion stroke injection of the previous combustion, as shown in FIG. 10B. Therefore, in the intake-compression stroke injection and compression-expansion stroke injection modes, the combustion mode to be entered is determined for each cylinder to enter a consistent combustion mode from the intake stroke to the exhaust stroke. Further, the fuel injection quantity is determined in the early stage of the intake stroke, and a consistent value (fuel injection quantity) is used in each of the intake, compression, expansion, and exhaust strokes.

The fuel injection mode and fuel injection quantity are determined in the early stage of the intake stroke. Subsequently, the cylinders are controlled based on the determined fuel injection timing and fuel injection quantity.

Figure 14:
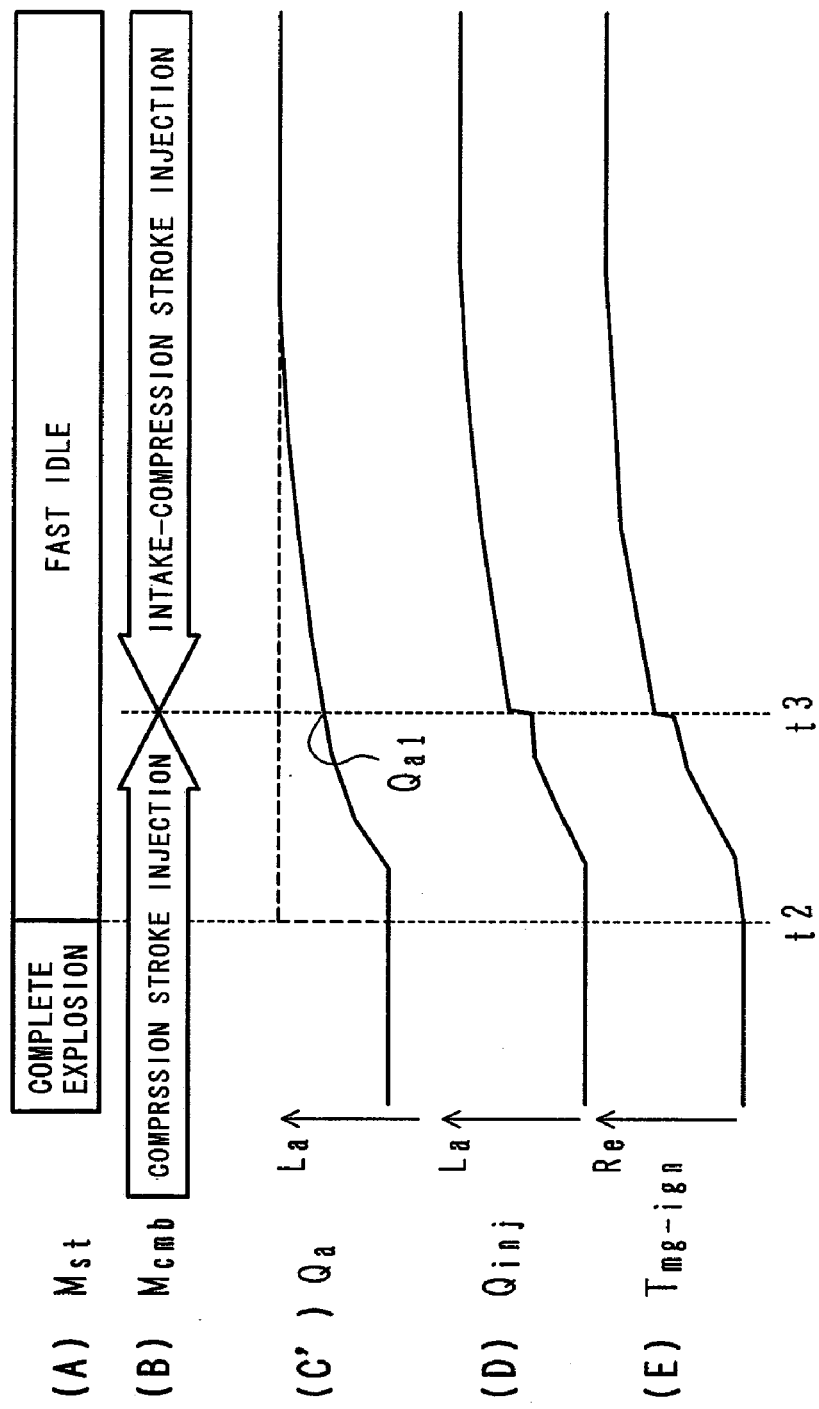
FIGS. 14A to 14E are timing charts showing a changeover mode for transition from the compression stroke injection mode to the intake-compression-stroke double injection mode (hereinafter referred to as intake-compression stroke injection mode) by the engine control apparatus according to an embodiment of the present invention.

A modification of catalyst warm-up control upon engine start-up by the engine control apparatus according to the present embodiment will be explained below with reference to FIGS. 13 and 14.

FIGS. 13A to 13F are timing charts showing a sequence of a modification of catalyst warm-up control upon engine start-up by the engine control apparatus according to an embodiment of the present invention. FIGS. 14A to 14E are timing charts showing a changeover mode for transition from the compression stroke injection mode to the intake-compression stroke injection mode by the engine control apparatus according to an embodiment of the present invention.

The example of FIGS. 3A to 3G uses the compression-expansion stroke injection mode for catalyst warm-up. However, as shown in FIG. 4, the filling efficiency can be increased even in the intake-compression stroke injection mode and accordingly combustion is obtained even if the ignition timing is largely retarded. Therefore, catalyst warm-up can also be performed through the intake-compression stroke injection mode.

Then, as shown in FIGS. 13A to 13F, catalyst warm-up in the fast idle mode is performed through intake-compression stroke injection. FIGS. 13A to 13F are equivalent to FIGS. 3A to 3F, respectively.

The combustion mode changeover process will be explained below with reference to FIGS. 14A to 14E. FIGS. 14A to 14E are equivalent to FIGS. 9A to 9E, respectively.

The time period between the time points t2 and t3 of FIGS. 14A to 14E corresponds to the changeover mode shown in FIGS. 13A to 13F.

After complete explosion of the engine at the time point t2, various conditions are satisfied and then the combustion mode changeover to the compression-expansion stroke injection mode is determined. Then, the target value of the throttle valve opening angle is rapidly increased as shown by the dashed line of FIG. 14C' so that the target intake air volume is used as a target air volume for intake-compression stroke injection. In response to the target value, the actual intake air volume gradually increases as shown by the solid line of FIG. 14C' accompanying the above-mentioned retard.

Since the engine torque increases with increasing air volume, the ignition timing is gradually retarded with increasing intake air volume as shown in FIG. 14D to cancel the increase in torque, thus attaining target constant engine torque.

At the time point t3, when the intake air volume exceeds a predetermined value Qa1, the intake-compression stroke injection mode is entered. The intake air volume Qa1 is an air volume that can supply the required fuel quantity even if fuel injection is performed twice.

In the present embodiment, the target air-fuel ratio for compression stroke injection is the weak lean air-fuel ratio rather than the stoichiometric air-fuel ratio, and that for intake-compression stroke injection is the stoichiometric air-fuel ratio. In order to select a rich air-fuel ratio with the identical intake air volume, the fuel injection quantity is increased stepwise as shown in FIG. 14C'. Further, in order to cancel an increase in the output torque accompanying the rich air-fuel ratio, the ignition timing is retarded stepwise as shown in FIG. 14E. Specifically, a change of the air-fuel ratio is associated with a change of ignition timing to attain target engine power.

During a time interval between the time points t2 and t3, the intake air volume gradually increases as shown in FIG. 14C' accompanying the above-mentioned retard. In order to cancel the increase in the output torque accompanying the increased air volume, the ignition timing is retarded as shown in FIG. 14E.

Although the weak lean air-fuel ratio is selected in the compression stroke injection mode, the stoichiometric air-fuel ratio is selected in the intake-compression stroke injection mode, and the weak lean air-fuel ratio is selected again in the compression-expansion stroke injection mode in the above explanation, it is also possible to select the stoichiometric air-fuel ratio in all of the compression stroke injection mode, intake-compression stroke injection mode, and compression-expansion stroke injection mode. In this case, neither fuel injection quantity nor ignition timing changes stepwise at the time point t3.

The present embodiment is characterized in that the intake-compression stroke injection mode is entered in the course of changeover from the compression stroke injection mode to the compression-expansion stroke injection mode. The present invention is characterized also in that, upon combustion mode changeover from the first combustion mode (compression stroke injection mode) in which fuel injection is performed at least once for each cylinder combustion to the second combustion mode (intake-compression stroke injection mode) in which fuel injection is performed a greater number of times with a larger intake air volume than the first combustion mode, control means performs the steps of changing in the first combustion mode (compression stroke injection mode) a target intake air volume required in the second combustion mode (intake-compression stroke injection mode); retarding the ignition timing; changing the second combustion mode (intake-compression stroke injection mode); and further retarding the ignition timing.

Figure 9:
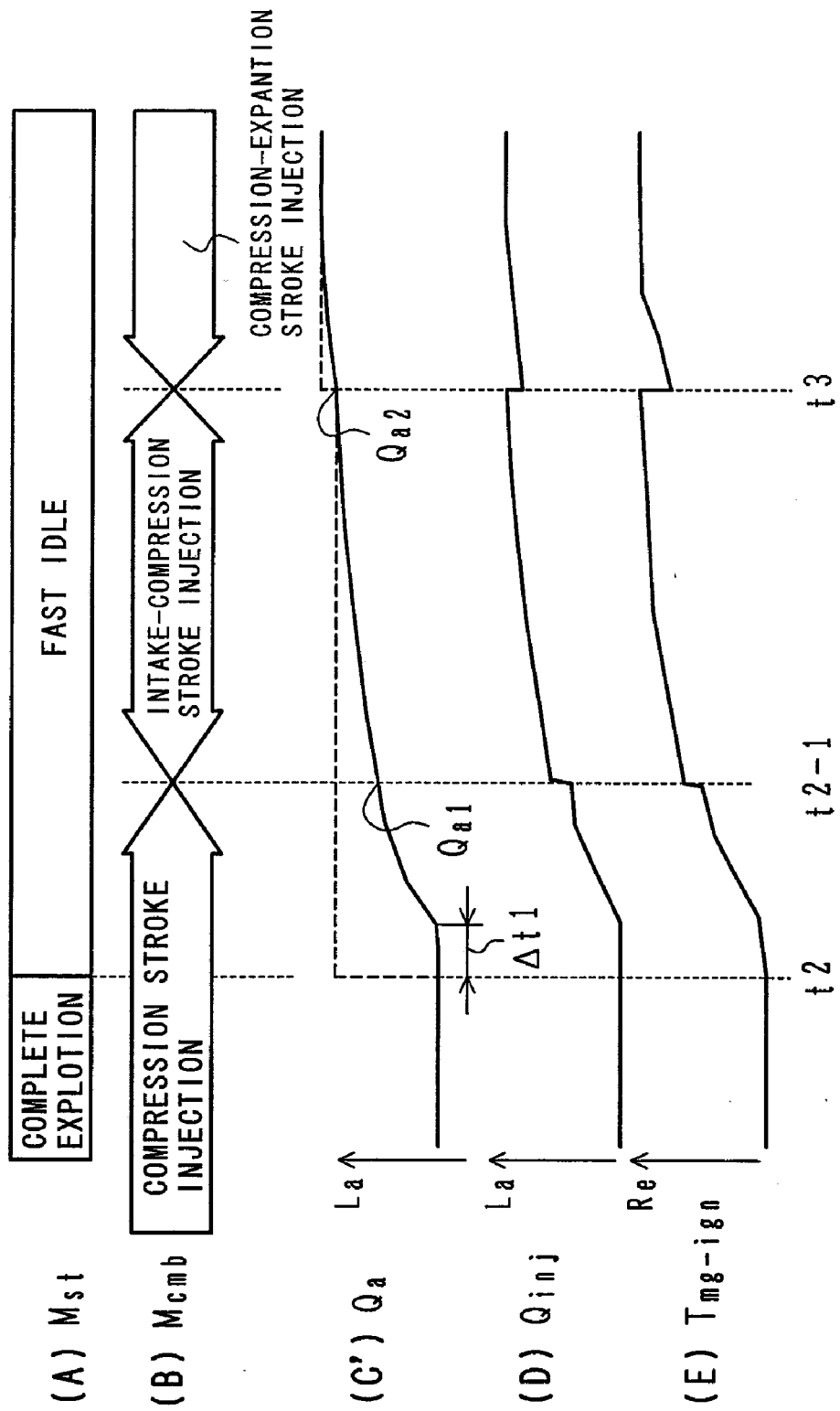
FIGS. 9A to 9E are timing charts showing a changeover mode for transition from the compression stroke injection mode to the compression-expansion stroke injection mode by the engine control apparatus according to an embodiment of the present invention.
Figure 10:
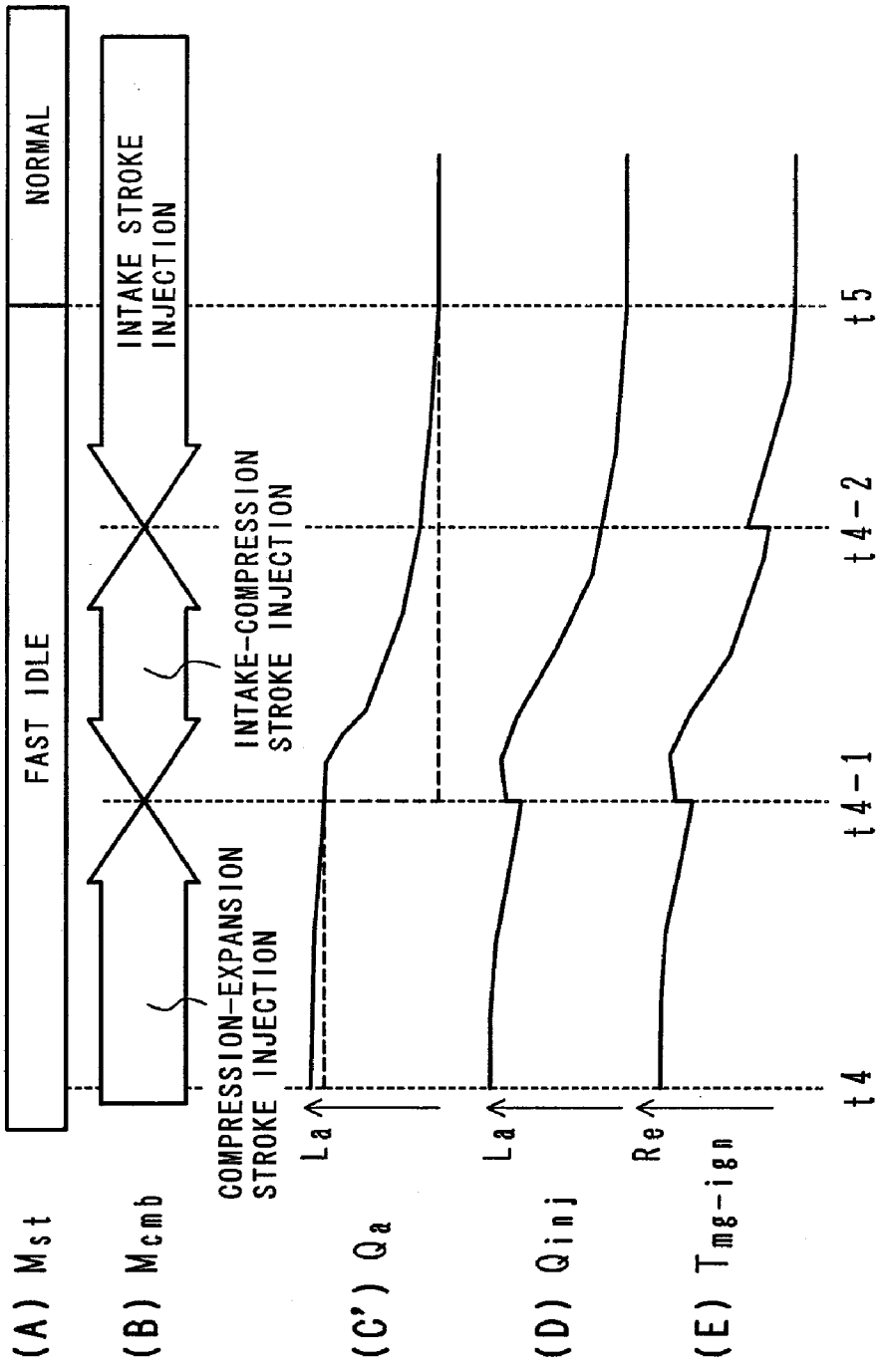
FIGS. 10A to 10E are timing charts showing a changeover mode for transition from the compression-expansion stroke injection mode to the intake stroke injection mode by the engine control apparatus according to an embodiment of the present invention.

With the operations after completion of catalyst warm-up, the combustion mode is changed basically in reverse order of the process of FIGS. 14A to 14E like the relation between FIGS. 9 and 10. Specifically, in FIG. 10B, the compression-expansion stroke injection mode is replaced with the intake-compression stroke injection mode. At the time point t4-1, the intake air volume is changed to the target air volume for the intake stroke injection mode.

As mentioned above, when fuel injection is performed twice in each combustion, a desired air-fuel mixture distribution is generated in the combustion chamber. Therefore, a relation between two fuel injection quantities may depend on the engine operating state. In such a case, it is preferable to use a combustion mode changeover timing at which a desired fuel quantity can be supplied from the injector also in fuel injection modes requiring a small fuel injection quantity.

The configuration of the engine control apparatus according to the present embodiment will be explained below with reference to FIG. 15.

Figure 15:
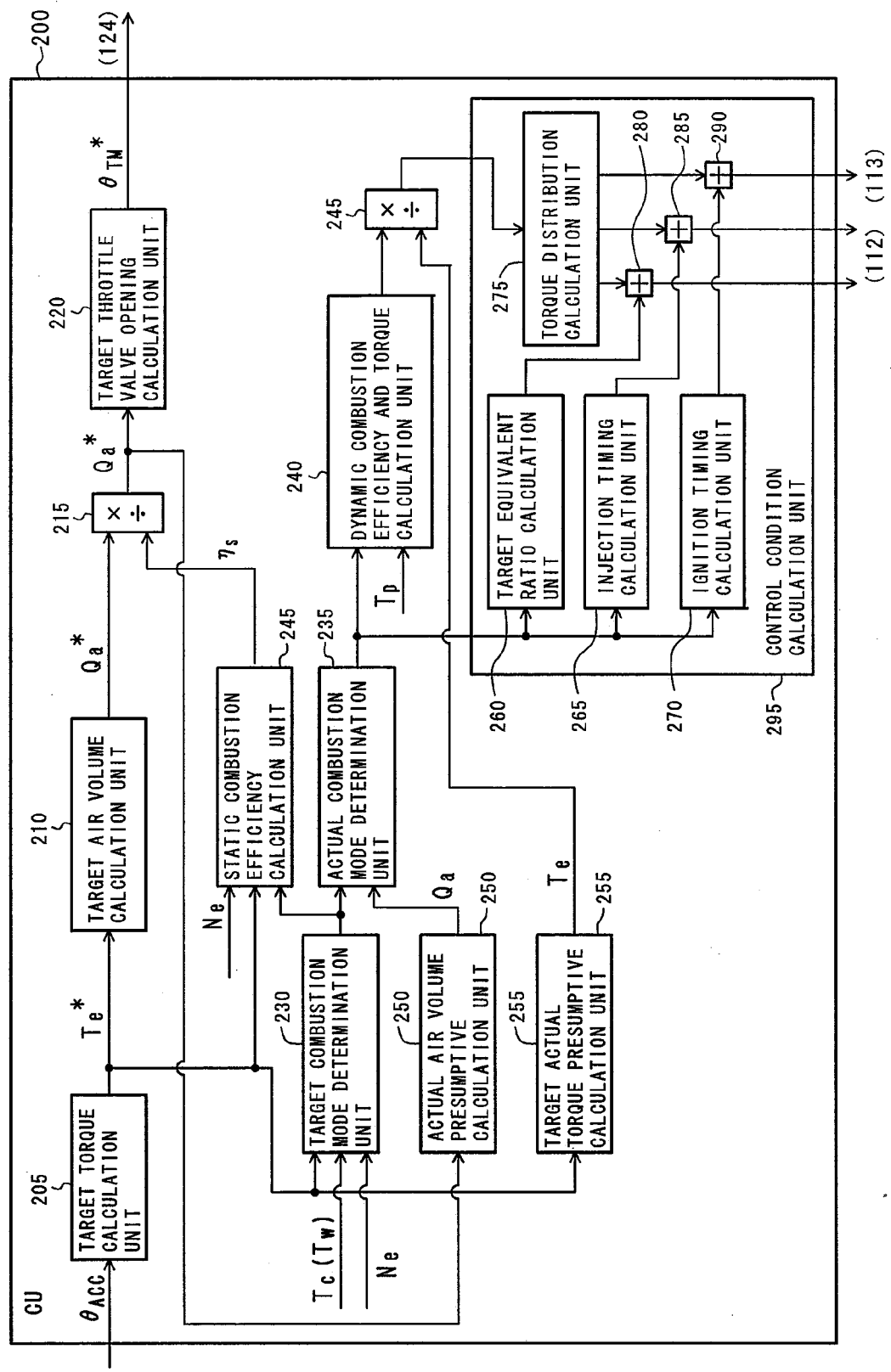
FIG. 15 is a block diagram showing the configuration of the engine control apparatus according to an embodiment of the present invention.

FIG. 15 is a block diagram showing the configuration of the engine control apparatus according to an embodiment of the present invention.

The control unit 200 outputs a target throttle valve opening angle to the electric throttle motor 124, an ignition timing to the ignition coil 113, and a target equivalent ratio and a fuel injection timing to the injector 112. Here, the target equivalent ratio denotes a target air-fuel ratio which is an element of fuel supply quantity calculation and also a correction factor for a theoretical air-fuel ratio. The control unit 200 calculates these outputs at each predetermined timing.

The control unit 200 includes a target torque calculation unit 205, a target air volume calculation unit 210, a divider 215, a target throttle valve opening angle calculation unit 220, a static combustion efficiency calculation unit 225, a target combustion mode determination unit 230, an actual combustion mode determination unit 235, a divider 245, an actual air volume presumptive calculation unit 250, target actual torque presumptive calculation unit 255, a target equivalent ratio calculation unit 260, an injection timing calculation unit 265, an ignition timing calculation unit 270, a torque distribution calculation unit 275, a multiplier 280, adders 280 and 290, and a control condition calculation unit 295. The target equivalent ratio calculation unit 260, the injection timing calculation unit 265, the ignition timing calculation unit 270, the torque distribution calculation unit 275, the multiplier 280, and the adders 285 and 290 are included in the control condition calculation unit 295.

The target torque calculation unit 205 calculates target torque Te* to be generated by the engine, based on an accelerator opening angle θACC which is a driver's intention to operate the vehicle. The accelerator opening angle θACC is detected by the accelerator opening angle sensor 130 of FIG.

2. When the accelerator opening angle is 0 degrees, i.e., when the accelerator pedal is not depressed, the target torque calculation unit 205 calculates target torque to maintain the idle rotational speed. The target torque calculation unit 205 can input externally required torque which is demanded from outside of the engine as an input signal, and calculate target torque in consideration of the externally required torque.

The target air volume calculation unit 210 calculates a target intake air volume Qa* in a predetermined reference state based on the target torque calculated by the target torque calculation unit 205. The target intake air volume for attaining the target torque is determined by the combustion efficiency which is an efficiency of conversion of the air-fuel ratio and supply fuel to torque. Therefore, a predetermined reference state is provided to calculate a target intake air volume. The predetermined reference state is, for example, a theoretical air-fuel ratio and reference ignition timing.

The divider 215 divides a change of the target intake air volume due to a difference between the actual operating state and the reference state by a correction coefficient (static combustion efficiency ηS) calculated by the static combustion efficiency calculation unit 225 to correct the target intake air volume Qa*. The target throttle valve opening angle calculation unit 220 calculates a target throttle valve opening angle θTH* associated with the target intake air volume corrected by the divider 15. The electric throttle motor 124 is controlled so that the throttle valve opening angle agrees with the target throttle valve opening angle θTH*.

On the other hand, the target combustion mode determination unit 230 receives the target torque Te* and other operating states (engine rotational speed Ne and catalyst temperature Tc) and determines and outputs the target combustion mode. The cooling water temperature Tw can also be used instead of the catalyst temperature Tc. The target combustion mode is a mode of combustion that should be steadily performed at that time. In the example of FIGS. 9A and 9E, the combustion mode changes from compression stroke injection to the compression-expansion stroke injection mode at the time point t2. Determination by the target combustion mode determination unit 230 will be mentioned later in detail with reference to FIG. 16.

Once the target combustion mode is determined, the target equivalent ratio, target ignition timing, etc. in the operating state are determined making it possible to obtain the combustion efficiency in the steady state. The static combustion efficiency calculation unit 225 calculates, as the static combustion efficiency, the ratio of the steady-state combustion efficiency to the reference state from the target torque Te* and operating state (engine rotational speed Ne). With the present embodiment, the larger the efficiency of conversion of fuel to engine power, the larger becomes the output value, and therefore the divider 215 divides the target intake air volume in a reference state by the correction coefficient. Therefore, the smaller the combustion efficiency, the smaller becomes the static combustion efficiency and the larger becomes the target intake air volume required. It goes without saying that, in actual application, it is preferable to suitably select characteristics of each parameter in consideration of the ease of overall calculation.

Then, the actual air volume presumptive calculation unit 250 presumes the actual intake air volume Qa based on the target intake air volume Qa*. As mentioned above, the cylinder inflow air volume has a retarding factor such as a collector, and therefore, even if the target intake air volume Qa* shown by the dashed line increases stepwise, the actual intake air volume Qa shown by the solid line increases after retard, as shown in FIG. 9C'. Presuming this retard, the actual air volume presumptive calculation unit 250 presumes the actual intake air volume Qa flowing into each cylinder.

The actual combustion mode determination unit 235 determines the actual combustion mode based on the target combustion mode determined by the target combustion mode determination unit 230 and the actual intake air volume Qa calculated by the actual air volume presumptive calculation unit 250. As mentioned above, the intake air volume needs to be at least a predetermined value associated with each fuel injection quantity in order to perform fuel injection twice. Therefore, the actual combustion mode determination unit 235 determines whether or not transition to the combustion mode to be steadily selected is enabled depending on the actual intake air volume presumption value. With the example of FIGS. 9A and 9E, at the time point t2, the target combustion mode determined by the target combustion mode determination unit 230 is the intake-compression stroke injection mode. However, at the time point t2-1, the intake-compression stroke injection mode cannot be performed until the intake air volume reaches Qa1 as shown in FIG. 9C'. Therefore, before the time point t2-1, the actual combustion mode is the compression stroke injection mode. At the time point t2-1, the actual combustion mode is changed to the intake-compression stroke injection mode. Judgment processing by the actual combustion mode determination unit 2 will be mentioned later in detail with reference to FIG. 17.

The target equivalent ratio calculation unit 260 calculates a target equivalent ratio according to the operating state based on the actual combustion mode determined by the actual combustion mode determination unit 235.

Further, the injection timing calculation unit 265 calculates a fuel injection timing based on the actual combustion mode determined by the actual combustion mode determination unit 235. With the example of FIGS. 9A and 9E, the injection timing calculation unit 265 calculates an injection timing at which fuel injection is performed once in the compression stroke in the compression stroke injection mode, an injection timing in the intake stroke in the intake-compression stroke injection mode, and an injection timing in the compression stroke.

Further, the ignition timing calculation unit 270 calculates ignition timing based on the actual combustion mode determined by the actual combustion mode determination unit 235.

Although the target equivalent ratio, fuel injection timing, and ignition timing calculated in this way are optimal values associated with the operating state at each timing, the generated engine torque does not agree with the required value in a state where the intake air volume has not reached the target value. For example, during the time period between the time points t2-1 and t3 of FIGS. 9A and 9E, the intake air volume has not reached the target value. However, the ignition timing to be obtained with the assumption of a steady state is a maximum retard value enabling the intake-compression stroke injection mode, and the generated torque runs short by an insufficient intake air volume. Then, processing for compensating the generated torque is performed by the torque distribution calculation unit 275. The target equivalent ratio calculated by the target equivalent ratio calculation unit 260, the fuel injection timing calculated by the injection timing calculation unit 265, and the ignition timing calculated by the ignition timing calculation unit 270 are slightly corrected by the torque distribution calculation unit 275.

First, the target actual torque presumptive calculation unit 255 performs calculations for presuming target actual torque Te from the target torque Te*. A request to generate engine torque by driver's accelerator operation intends a throttle valve operation and assumes a retard such as a collector response, as mentioned above. Therefore, even if the accelerator is fully opened rapidly, for example, generated engine torque equivalent to fully-open torque is attained accompanying a retard such as a collector response delay. On the other hand, externally required torque such as torque shock absorption during gearshift of an automatic transmission needs to be attained as immediately as possible. Therefore, the target actual torque presumptive calculation unit 255 suitably performs appropriate retarding or the like depending on the type of required torque to calculate target torque to be generated by the engine at that timing.

The dynamic combustion efficiency and torque calculation unit 240 obtains a dynamic combustion efficiency $\eta d$ associated with the target equivalent ratio, fuel injection timing, and ignition timing obtained by the target equivalent ratio calculation unit 260, injection timing calculation unit 265, and ignition timing calculation unit 270, respectively, based on the actual combustion mode obtained by the actual combustion mode determination unit 235 and a measurement value parameter of the actual cylinder intake air volume Tp. The dynamic combustion efficiency and torque calculation unit 240 obtains output torque before correction from the dynamic combustion efficiency $\eta d$ and the actual cylinder intake air volume Tp. Calculation by the dynamic combustion efficiency and torque calculation unit 240 will be mentioned later in detail with reference to FIG. 18.

The divider 245 divides the output ratio before correction obtained by the dynamic combustion efficiency and torque calculation unit 240 by the target actual torque Te obtained by the target actual torque presumptive calculation unit 255 to calculate the torque surplus rate before correction. The torque surplus rate is 1 or higher if the actual torque is excessive or less than 1 if the actual torque is not sufficient.

The torque distribution calculation unit 275 calculates an ignition timing correction quantity, injection timing correction quantity, and target equivalent ratio correction quantity in order to cancel the torque surplus rate obtained by the divider 245.

The multiplier 280 multiplies the target equivalent ratio calculated by the target equivalent ratio calculation unit 260 by the target equivalent ratio correction quantity calculated by the torque distribution calculation unit 275 to calculate a target equivalent ratio after correction, and outputs it to the injector 112. As mentioned above, the target equivalent ratio is a correction factor for the theoretical air-fuel ratio. Therefore, when the engine is operated with the theoretical air-fuel ratio (A/F=14.7:stoichiometric air-fuel ratio), the correction factor is 1.0. In this case, fuel having the theoretical air-fuel ratio with respect to the actual intake air volume Qa is injected from the injector 112. FIG. 9D shows a fuel injection quantity calculated in this way.

The adder 285 adds the target injection timing correction quantity calculated by the torque distribution calculation unit 275 to the fuel injection timing calculated by the injection timing calculation unit 265 to calculate a target injection timing after correction, and outputs it to the injector 112.

The adder 290 adds the target ignition timing calculated by the torque distribution calculation unit 275 to the ignition timing calculated by the ignition timing calculation unit 270 to calculate a target ignition timing after correction, and outputs it to the ignition coil 113.

For example, during the time period between the time points t2-1 and t3 of FIGS. 9A and 9E, the intake air volume has not reached the target value. However, the ignition timing to be obtained with the assumption of a steady state is a maximum retard value that enables the intake-compression stroke injection mode, and the generated torque runs short by the insufficient intake air volume. Therefore, the correction value on the advance side of the ignition timing is calculated to correct insufficient torque, and the ignition timing is corrected based on the correction value. FIG. 9E shows an ignition timing corrected in this way. Then, appropriate generated torque can be attained for the target actual torque.

Figure 16:
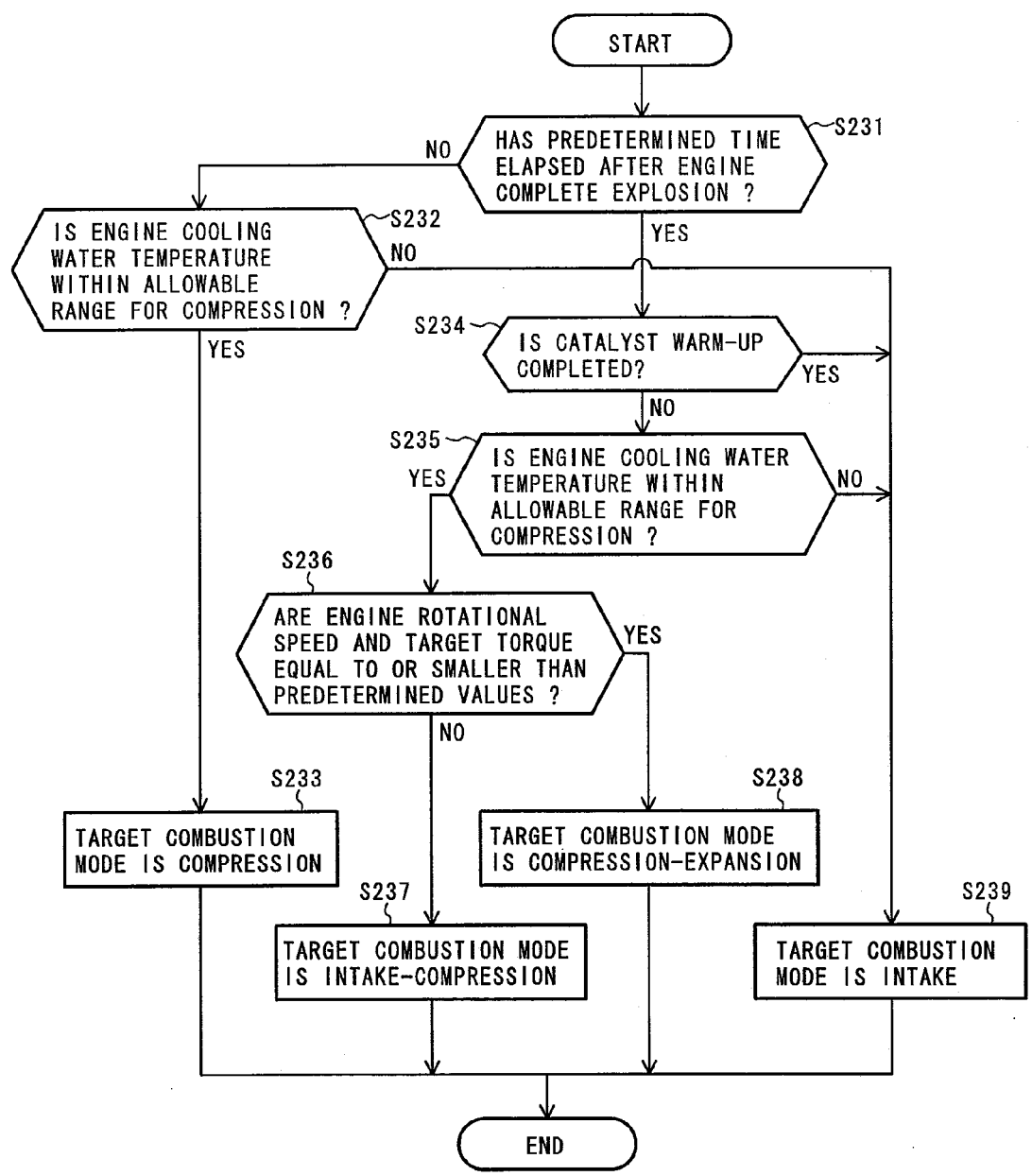
FIG. 16 is a flow chart showing target combustion mode judgment processing by a target combustion mode determination unit used for the engine control apparatus according to an embodiment of the present invention.

The following explains target combustion mode judgment processing by the target combustion mode determination unit 230 used for the engine control apparatus according to the present embodiment with reference to FIG. 16.

FIG. 16 is a flow chart showing target combustion mode judgment processing by the target combustion mode determination unit used for the engine control apparatus according to an embodiment of the present invention.

As mentioned above, when catalyst warm-up is to be performed at the early stage, it is preferable to perform compression-expansion stroke injection (or intake-compression stroke injection mode). On the other hand, in the compression-expansion stroke injection mode, there is a limitation in generated torque that can be attained. If catalyst warm-up is not necessary, it is desirable to reduce the number of injector actuations in the intake stroke injection mode, reduce the power consumption of the injector, and alleviate the load of calculation processing. The target combustion mode determination unit 230 performs the above-mentioned combustion mode judgment processing.

In Step S231, the target combustion mode determination unit 230 determines whether or not a predetermined time has elapsed after complete explosion of the engine. Here, the predetermined time is a time period since the engine rotational speed exceeds a complete explosion rotational speed until it reaches a fast idle rotational speed. If the predetermined time has not elapsed, processing proceeds to Step S232 and, after a predetermined time has elapsed, proceeds to Step S234.

If the predetermined time has not elapsed after complete explosion of the engine, the target combustion mode determination unit 230, in Step S232, determines whether or not the engine cooling water temperature is within an allowable range of the compression stroke injection mode. Here, the cooling water temperature within the allowable range refers to a cooling water temperature at which compression stroke injection is possible, for example, a temperature range from about −10 to 80 degrees Celsius. If the engine cooling water temperature is within the allowable range, processing proceeds to Step S233 in which the target combustion mode determination unit 230 changes the target combustion mode to the compression stroke injection mode. If the engine cooling water temperature is out of the allowable range (for example, 80 degrees Celsius or higher), catalyst warm-up is completed and no longer necessary and therefore processing proceeds to Step S239 to select the intake stroke injection mode.

If it is determined that a predetermined time has elapsed in Step S231, the target combustion mode determination unit 230 determines whether or not catalyst warm-up is completed in Step S234. If catalyst warm-up is completed, processing proceeds to Step S239 to select the intake stroke injection mode.

The completion of catalyst warm-up is determined by determining whether or not the catalyst warm-up combustion mode has been executed for a predetermined time or longer. The completion of catalyst warm-up is determined if an integrated value of estimated thermal energy given to the catalyst exceeds a predetermined value, if an integrated value of the intake air volume after the engine is started up exceeds a predetermined value, if a detection value of direct catalyst temperature detection exceeds a predetermined value, or if measured degree of activity of catalyst exceeds a predetermined value.

If catalyst warm-up is not completed, the target combustion mode determination unit 230, in Step S235, determines whether or not the engine cooling water temperature is within a predetermined range. If the engine cooling water temperature is within the predetermined range, processing proceeds to Step S236; otherwise, processing proceeds to Step S239 to select the intake stroke injection mode. Here, the cooling water temperature within the predetermined range refers to a cooling water temperature at which the catalyst is in a cold state and ignition retard for catalyst warm-up is possible, for example, a temperature range from about −10 to 40 degrees Celsius. If the engine cooling water temperature is within the predetermined range, the target combustion mode determination unit 230, in Step S236, determines whether or not the engine rotational speed is below a predetermined value and the target torque is below a predetermined value. If this condition is satisfied, processing proceeds to Step S238 to change the target combustion mode to the compression-expansion stroke injection mode; otherwise, processing proceeds to Step S237 to change the target combustion mode to the intake-compression stroke injection mode. Specifically, a range in which combustion in the compression-expansion stroke injection mode is possible is limited to a range in which the target torque is below predetermined torque and the engine rotational speed is below a predetermined rotational speed. If this condition is satisfied, the compression-expansion stroke injection mode is entered.

Figure 17:
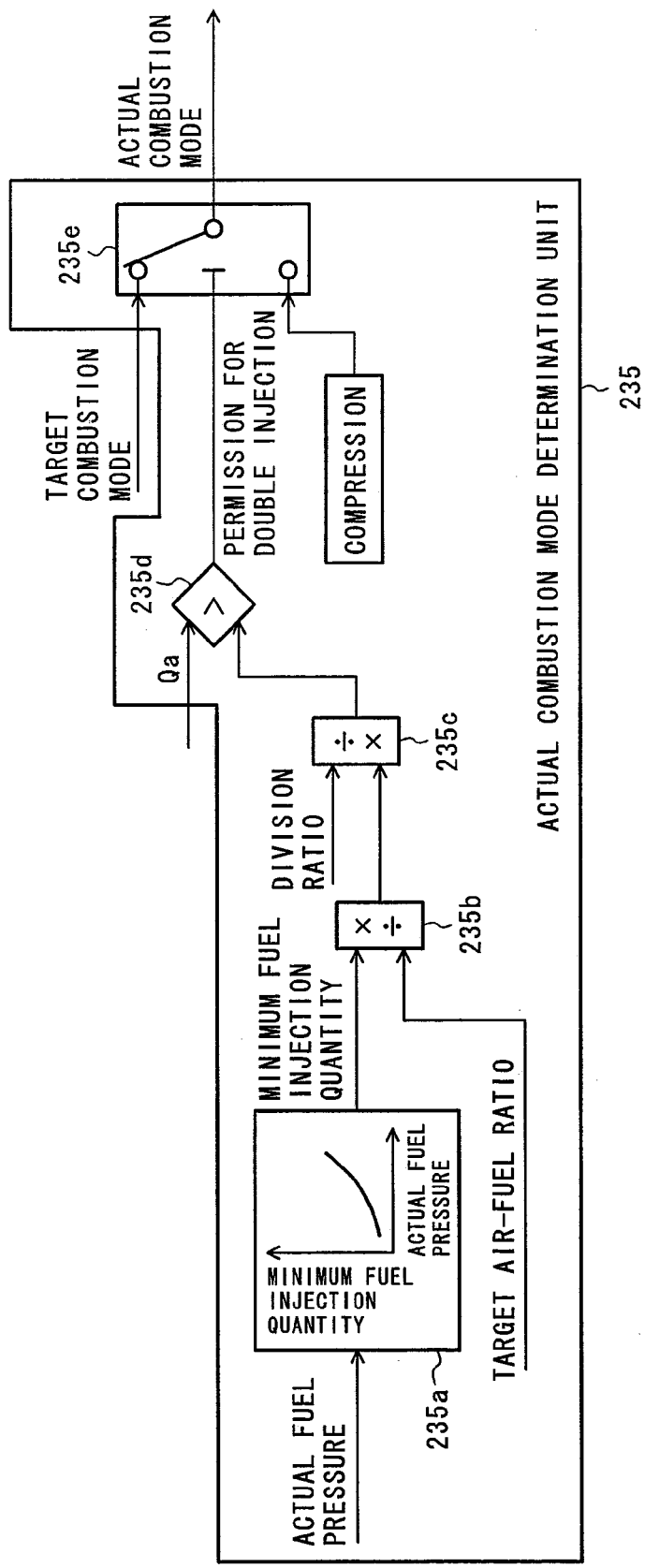
FIG. 17 is a block diagram showing processing by an actual combustion mode determination unit used for the engine control apparatus according to an embodiment of the present invention.

The following explains actual combustion mode judgment processing by the actual combustion mode determination unit 235 used for the engine control apparatus according to the present embodiment with reference to FIG. 17.

FIG. 17 is a block diagram showing processing by the actual combustion mode determination unit used for the engine control apparatus according to an embodiment of the present invention.

As mentioned above, the actual combustion mode determination unit 235 determines that fuel injection can be performed twice and therefore a minimum fuel injection quantity is calculated by the minimum fuel injection quantity calculation unit 235a. With the present embodiment, if the minimum injectable fuel quantity of the injector differs because of the fuel pressure of high-pressure fuel applied to an upstream of the injector, the minimum fuel injection quantity is obtained from the actual fuel pressure through table search. In general, with an injector having a structure such that the valve opens overcoming applied fuel pressure, the valve operation becomes slower with increasing fuel pressure possibly resulting in a prolonged controllable fuel injection period. The higher the fuel pressure, the larger becomes the fuel flow rate per unit time while the valve is open. Then, comprehensively taking these characteristics into consideration, the present embodiment uses means for retrieving a table. If the minimum injectable fuel quantity can be calculated through a formula based on predetermined operating state parameters, formula-based calculation may be used.

The divider 235b divides the minimum fuel injection quantity calculated by minimum fuel injection quantity calculation unit 235a by the target air-fuel ratio to obtain an intake air volume corresponding to the minimum injection quantity.

The multiplier 235c divides the intake air volume corresponding to the minimum injection quantity calculated by the divider 235b by the division ratio of the fuel injection quantity. Here, the division ratio refers to a ratio of the fuel injection quantity of each injection to the total injection quantity used for each combustion as mentioned above. The division ratio is suitably calculated so as to generate a desired air-fuel mixture in the combustion chamber depending on the operating state. Then, as the division ratio to be supplied to the multiplier 235c, one of two fuel injection quantities whichever smaller is used. This makes it possible to obtain an intake air volume used in one combustion that can be attained by double injection.

Then, comparator 235d compares the actual intake air volume (air volume suctioned in each combustion) with the intake air volume used in one combustion that can be attained by double injection, and, if the actual intake air volume is larger, the comparator 235d determines that double injection is possible and outputs a permission for double injection.

A selector 235e selects the target combustion mode or the compression stroke injection mode. If a permission for double injection is not output, the selector 235e outputs the compression stroke injection mode as the actual combustion mode; if a permission for double injection is output, the selector 235e outputs the target combustion mode as it is as the actual combustion mode. With the example of FIGS. 9A and 9E, at the time point t2, the target combustion mode is the intake-compression stroke injection mode. At this timing, double injection is not permitted and therefore the compression stroke injection mode is entered. When double injection is permitted at the time point t2, the intake-compression stroke injection mode is entered.

The intake-compression stroke injection and compression-expansion stroke injection modes are not distinguished from each other in the above explanation. The division ratio is determined by combustion requirements and therefore a required value is present for each combustion mode. Therefore, it is preferable to perform the above-mentioned judgment processing for each combustion mode. The above-mentioned processing makes it possible to determine whether or not fuel injection can be performed twice for each combustion in relation to the minimum injectable fuel quantity of the injector.

A method for obtaining a point B on the dashed line of the fast idle torque of FIG. 4 in the intake-compression stroke injection mode has been explained above. Combustion continues if combustion mode changeover is performed within a range where both a combustible region for the intake stroke injection mode and a combustible region for the intake-compression stroke injection mode are obtained, that is, between points B and C on the fast idle torque.

A method for obtaining the point C of FIG. 4 will be explained below. Since the point C is a boundary where combustion on the retard side of ignition timing in the intake stroke injection mode is obtained, it is necessary that the retard quantity with respect to the standard ignition timing in the combustion mode is at least a predetermined value, for example, the ignition timing correction quantity calculated by the torque distribution calculation unit 275 of FIG. 15 is at least a predetermined value on the retard side. From the viewpoint of the combustion efficiency, the ratio of the actual intake air volume to the standard intake air volume, for example, the ratio of the output of the target air volume calculation unit 210 of FIG. 15 to that of the actual air volume presumptive calculation unit 250 is a reciprocal of the combustion efficiency at a time point. Therefore, it is necessary that the ratio is at least a predetermined value. In addition, it is preferable to suitably select values using calculation parameters present for calculations.

A method for obtaining points B and C of FIG. 15 has been explained above. There may be a delay between processing for determining changeable timing and actual combustion changeover because it is necessary to recognize strokes for each cylinder as mentioned above. Therefore, the changeover to the intake-compression stroke injection mode is determined at the point B, and the changeover to the intake stroke injection mode is determined at the point C. It is preferable to perform changeover within a range where a combustible region for the intake stroke injection mode and that for the intake-compression stroke injection mode are obtained.

More simply, since combustion can be continued if combustion mode changeover is performed between points B and C of FIG. 15, it is also possible to perform combustion mode changeover after a predetermined time has elapsed after the judgment of combustion mode changeover.

Figure 18:
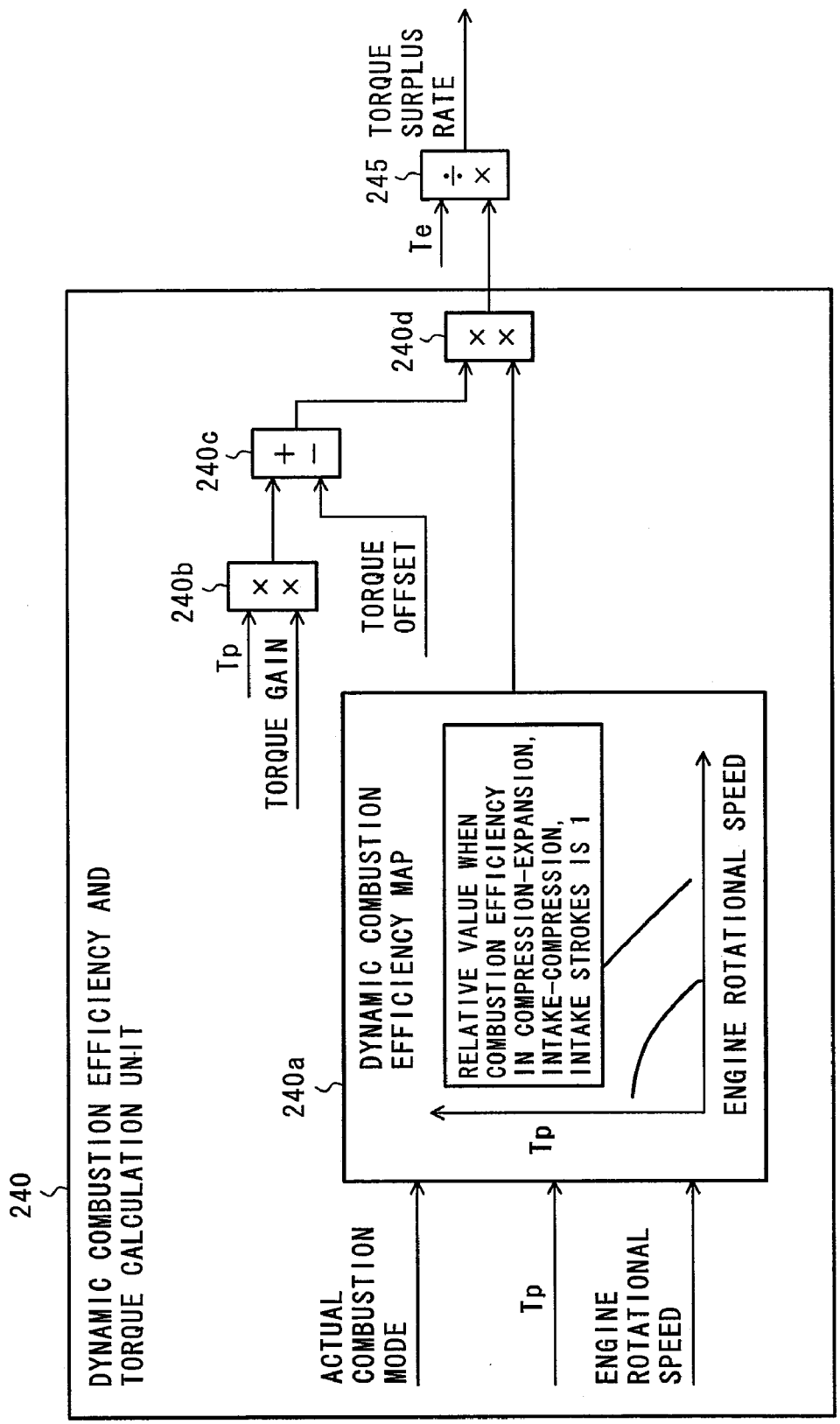
FIG. 18 is a block diagram showing processing by a dynamic combustion efficiency and torque calculation unit used for the engine control apparatus according to an embodiment of the present invention.

The following explains processing by the dynamic combustion efficiency and torque calculation unit 240 used for the engine control apparatus according to the present embodiment with reference to FIG. 18.

FIG. 18 is a block diagram showing processing by the dynamic combustion efficiency and torque calculation unit used for the engine control apparatus according to an embodiment of the present invention.

The dynamic combustion efficiency calculation unit 240a obtains the dynamic combustion efficiency based on the actual combustion mode, intake air volume for each combustion (Tp), and engine rotational speed by means of a dynamic combustion efficiency map. As mentioned above, the dynamic combustion efficiency is related to the target equivalent ratio, fuel injection timing, and ignition timing obtained by the target equivalent ratio calculation unit 260, the injection timing conversion section 265, and the ignition timing calculation unit 270, respectively. The present embodiment obtains the dynamic combustion efficiency as a relative value (ratio) on the assumption that the theoretical air-fuel ratio and standard ignition timing in the intake stroke injection mode are a reference state, and the combustion efficiency in the reference state is one.

On the other hand, the multiplier 240b multiplies the intake air volume for each combustion (Tp) by the standard torque gain, and the subtractor 240c subtracts the torque offset from the output of multiplier 240b to obtain the standard equivalent generated torque corresponding to the intake air volume for each combustion (Tp).

The multiplier 240d multiplies the dynamic combustion efficiency calculated by the dynamic combustion efficiency calculation unit 240a by the standard equivalent generated torque to calculate generated torque with the target equivalent ratio, fuel injection timing, and ignition timing obtained by the target equivalent ratio calculation unit 260, the injection timing calculation unit 265, and the ignition timing calculation unit 270, respectively.

As mentioned above, while the intake air volume has not reached the target value, the generated torque before correction calculated in this way does not agree with the target torque.

The divider 245 divides the generated torque before correction by the target torque Te to calculate the torque surplus rate.

The torque surplus rate under operation with the fuel injection quantity, ignition timing, and fuel injection timing before generated torque correction can be obtained through the above-mentioned processing, making it possible to supply an input value to the processing for calculating correction values of the fuel injection quantity, ignition timing, and fuel injection timing that cancel surplus torque.

Figure 19:
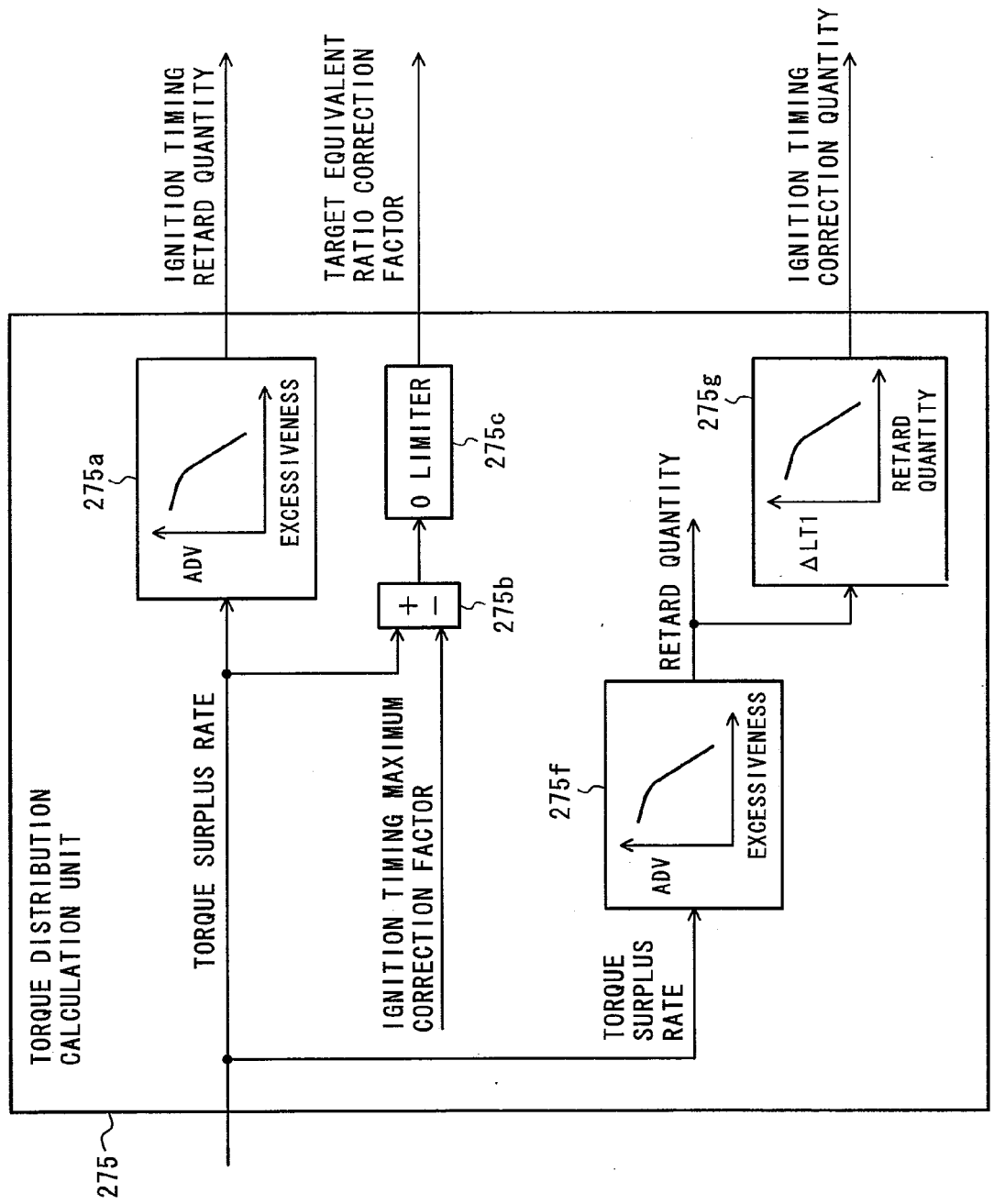
FIG. 19 is a block diagram showing processing by a torque distribution calculation unit used for the engine control apparatus according to an embodiment of the present invention.

The following explains processing by the torque distribution calculation unit 275 used for the engine control apparatus according to the present embodiment with reference to FIG. 19.

FIG. 19 is a block diagram showing processing by the torque distribution calculation unit used for the engine control apparatus according to an embodiment of the present invention.

In FIG. 19, an ignition timing retarding quantity calculation unit 275a, a subtractor 275b, and a limiter 275c calculate an ignition timing correction factor and target equivalent ratio correction factor in the intake-compression stroke injection mode. These values are calculated in the same way also in the intake stroke injection mode.

Based on the torque surplus rate, the ignition timing retarding quantity calculation unit 275a calculates an ignition timing correction quantity (ignition timing retard quantity) for canceling the torque surplus rate through table search. In the intake-compression stroke injection mode, the sensitivity of the torque operation rate for the ignition timing operation quantity remains almost the same within a wide range of the operation region, and therefore, the present embodiment uses a collective table search method. If the ignition timing and torque operation rate of each combustion mode have individual characteristics, it is preferable to selectively use a search table depending on the combustion mode, calculate target values through an appropriate formula, or perform other methods.

The subtractor 275b subtracts an ignition timing maximum correction factor, i.e., a maximum value that can be corrected through ignition timing operation, from the torque surplus rate. If the resultant value is positive, a torque surplus rate out of a range where combustion is obtained through ignition timing operation has occurred. This torque surplus rate should be corrected with fuel. The limiter 275c limits calculation results to positive values. Since the equivalent ratio and generated torque are approximately proportional to each other in the vicinity of the theoretical air-fuel ratio, a desired torque surplus can be restrained by dividing the target equivalent ratio by the target equivalent ratio correction factor.

In this way, the subtractor 275b and limiter 275c calculate a target equivalent ratio correction value if a torque surplus rate out of a range where combustion is obtained through ignition timing operation occurs.

In FIG. 19, a retard quantity calculation unit 275f and a retard quantity correction unit 275g calculate ignition timing and fuel injection timing correction values in the compression-expansion stroke injection mode.

Based on the torque surplus rate, the retard quantity calculation unit 275f obtains an ignition timing correction quantity for canceling the torque surplus rate through table search, like the ignition timing retarding quantity calculation unit 275a. Here, if the sensitivity of the torque operation rate for the ignition timing operation quantity in the compression-expansion stroke injection mode differs from the characteristics shown in the retard quantity calculation unit 275f, it is preferable to set characteristics in the compression-expansion stroke injection mode in a table. As explained with reference to FIG. 7, the compression-expansion stroke injection mode has a stable combustion region that depends on the ignition timing and fuel injection timing. Therefore, if the ignition timing is operated for torque operation, it is necessary to adjust the fuel injection timing with the ignition timing so that the fuel injection timing is within the stable combustion region.

The retard quantity correction unit 275g obtains a fuel injection timing correction quantity $\Delta IT1$ that can ensure combustion stability through table search in relation to the ignition timing operation quantity, and correct the fuel injection timing with the obtained value.

The present embodiment shows an example for correcting the fuel injection timing of the compression stroke. When fuel injection timing correction of the expansion stroke is required, it is preferable to make correction with a similar method. Although the present embodiment uses a method for obtaining a fuel injection timing correction value through table search, it is preferable to suitably select a correction value calculation method based on combustion characteristics and the convenience of calculation processing.

As mentioned above, it is desirable that the correction explained with reference to FIG. 19 be performed within a range where combustion is obtained. Therefore, it is preferable to suitably provide a limiter for limiting the correction quantity within a range where combustion is obtained.

In the intake-compression stroke injection and compression-expansion stroke injection modes, it is desirable to retard the ignition timing within a maximum combustible range to obtain the catalyst warm-up effect. In this case, however, a large filling efficiency is required with decreasing combustion efficiency as mentioned above, and therefore a large throttle valve opening angle is required. In this case, there may be a demand for restraining an excessive throttle valve opening angle, for example, when engine noise is easily heard from the intake passage. In this case, it is preferable to set an ignition timing retard quantity to prevent the excessive throttle valve opening angle.

Figure 20:
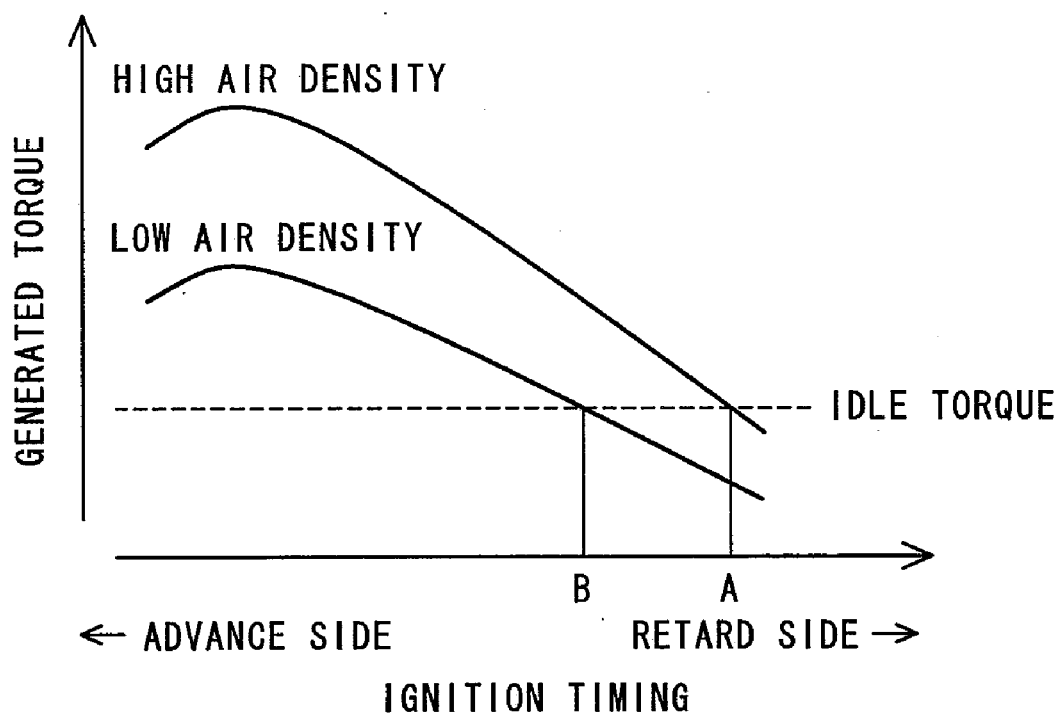
FIG. 20 is a diagram showing the principle of ignition timing correction by the air density.
Figure 21:
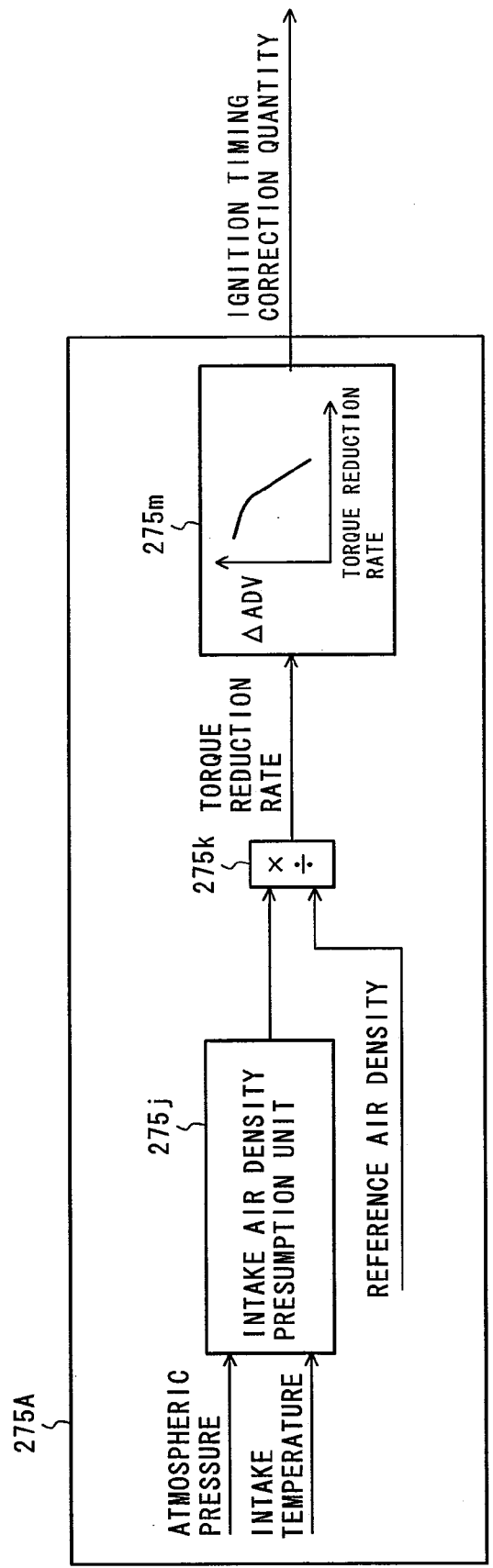
FIG. 21 is a block diagram showing other processing by an ignition timing correction quantity calculation unit of the torque distribution calculation unit used for the engine control apparatus according to an embodiment of the present invention.
Figure 22:
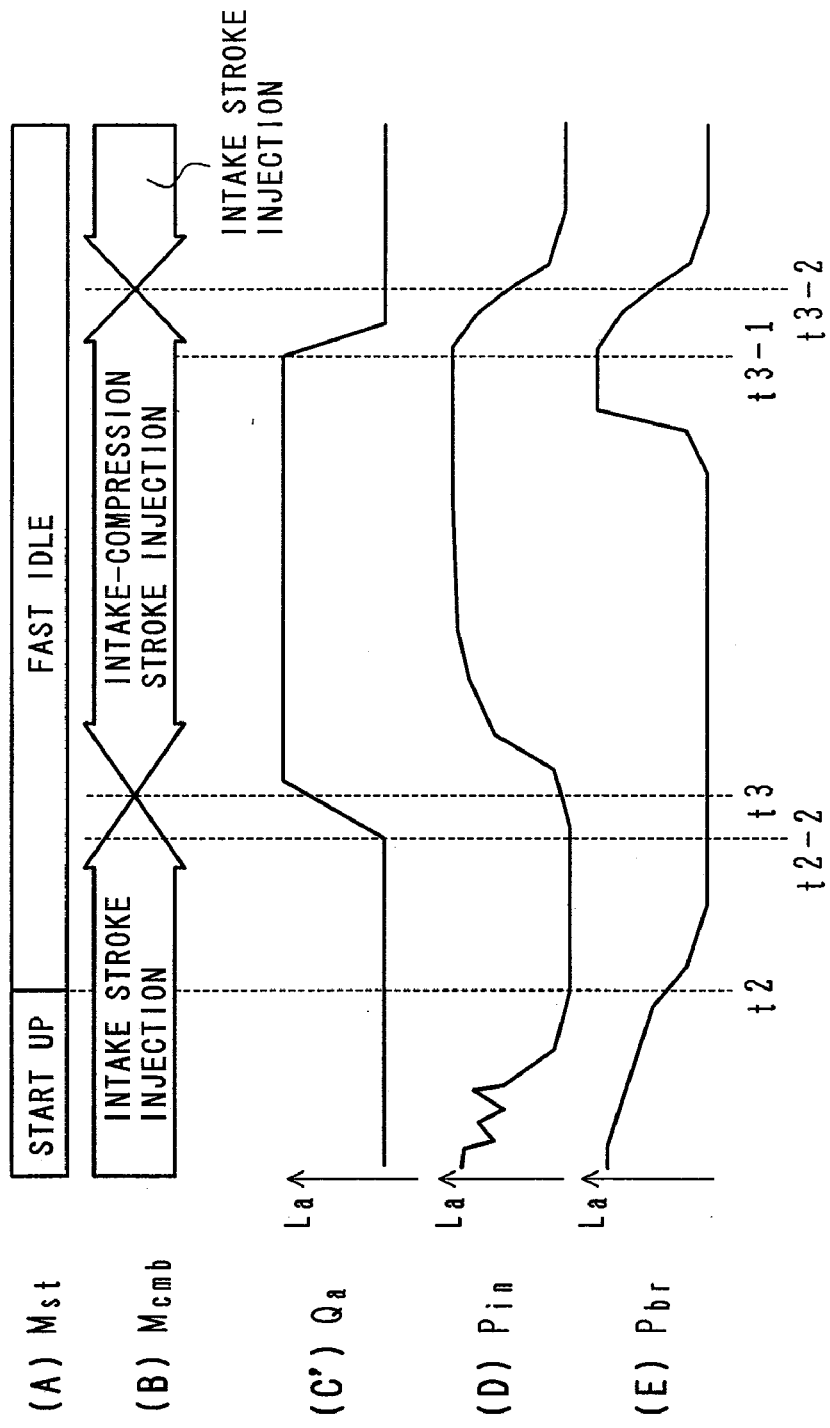
FIGS. 22A to 22E are timing charts showing additional processing by the target combustion mode determination unit used for the engine control apparatus according to an embodiment of the present invention.
Figure 23:
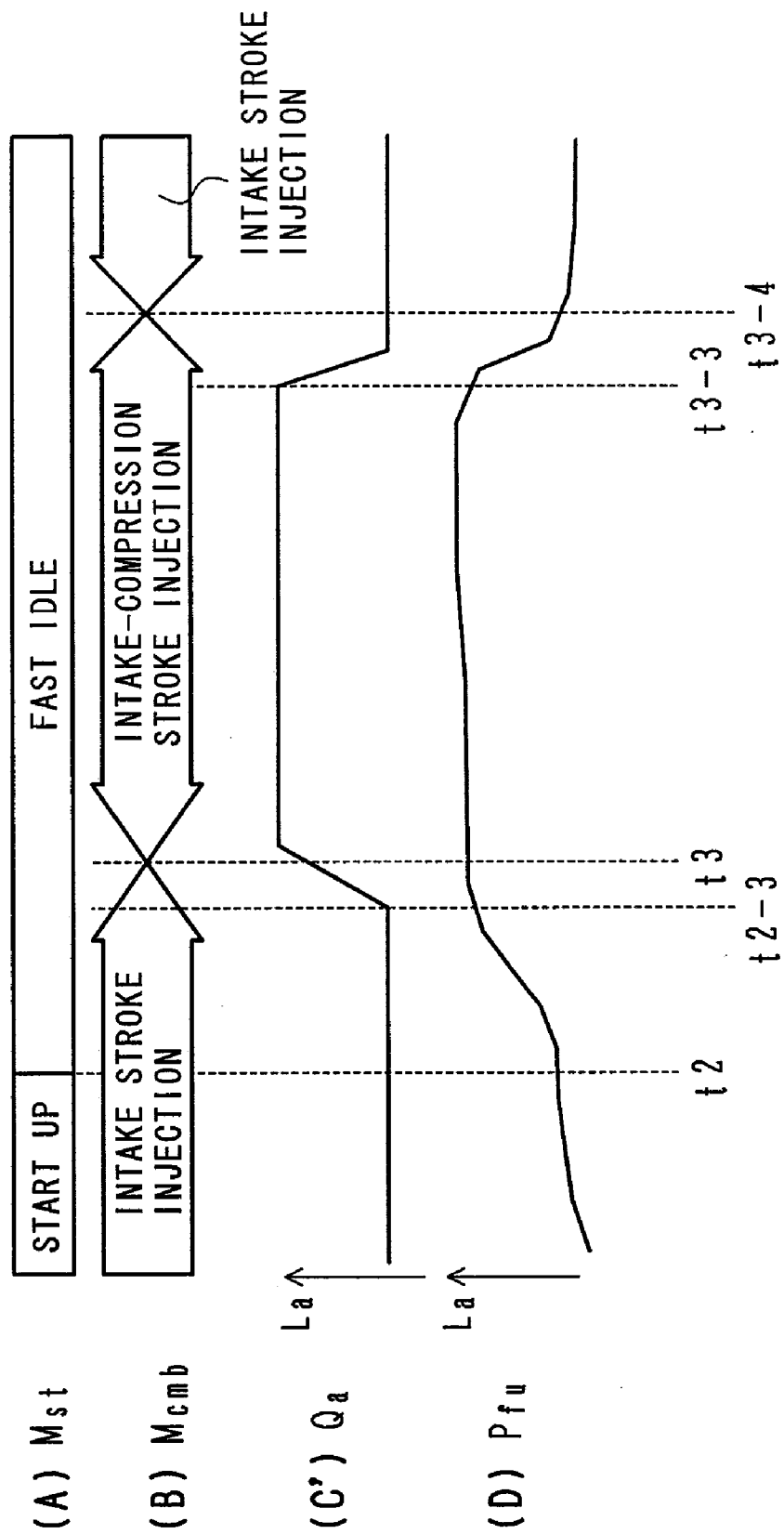
FIGS. 23A to 23D are timing charts showing second additional processing by the target combustion mode determination unit used for the engine control apparatus according to an embodiment of the present invention.
Figure 24:
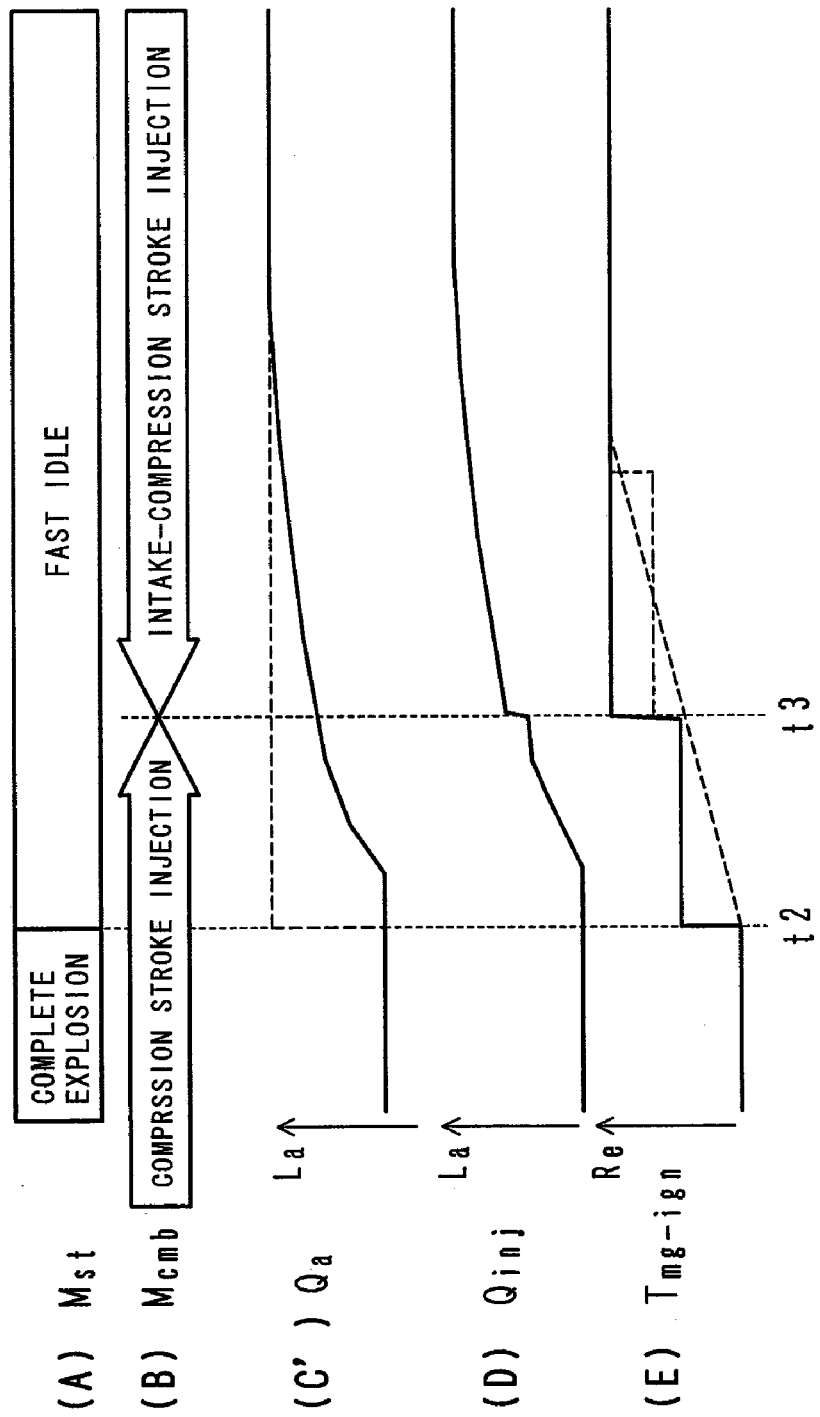
FIGS. 24A to 24E are timing charts showing additional processing by the torque distribution unit used for the engine control apparatus according to an embodiment of the present invention.
Figure 25:
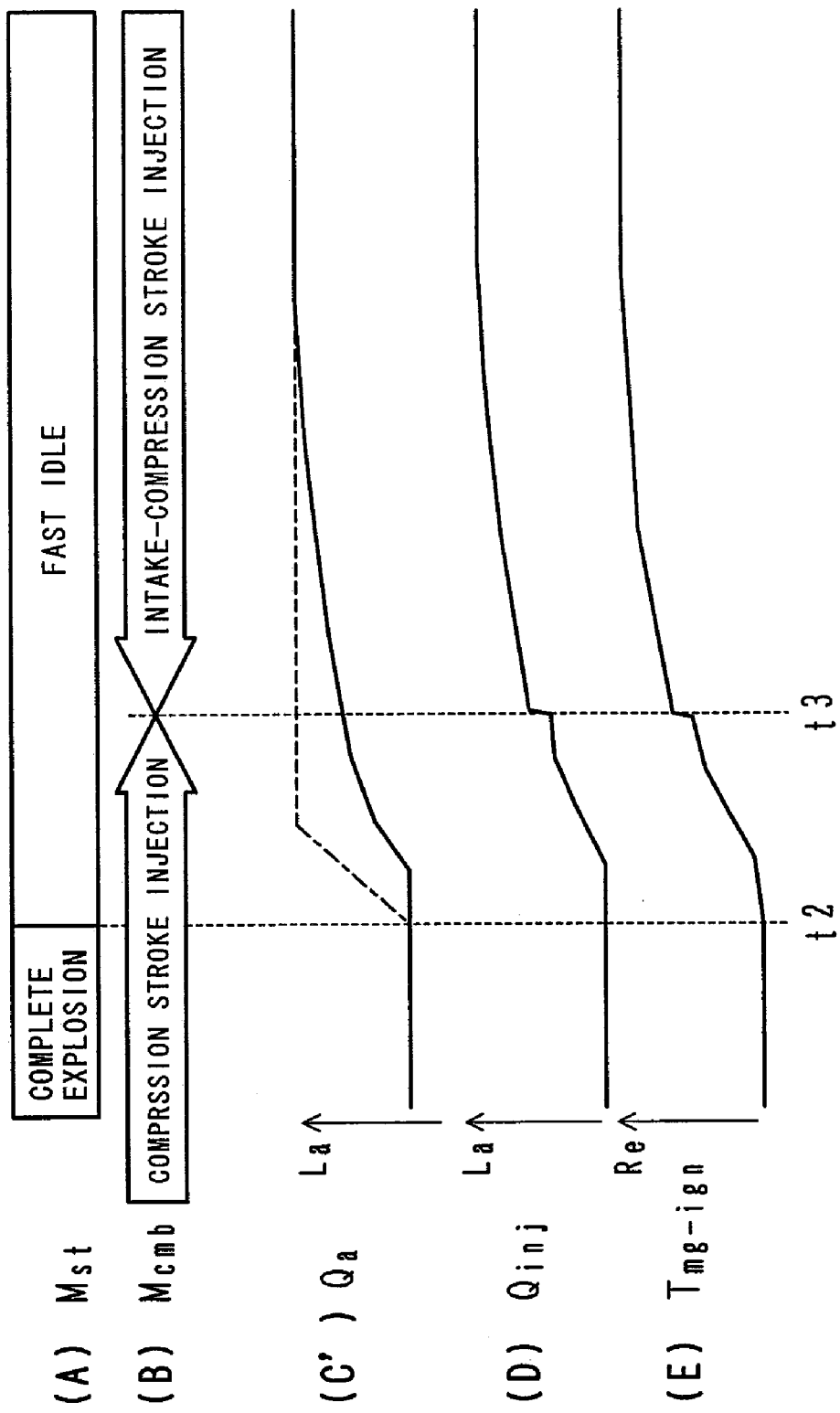
FIGS. 25A to 25E are timing charts showing second additional processing by the torque distribution unit used for the engine control apparatus according to an embodiment of the present invention.

The following explains other processing by the ignition timing correction quantity calculation unit in the torque distribution calculation unit 275 used for the engine control apparatus according to the present embodiment with reference to FIGS. 20 and 21.

FIG. 20 is a diagram showing the principle of ignition timing correction based on the air density.

FIG. 21 is a block diagram showing other processing by the ignition timing correction quantity calculation unit of the torque distribution calculation unit used for the engine control apparatus according to an embodiment of the present invention.

The intake air density depends on the state of the circum-ambient atmosphere during engine operation. For example, with a low atmospheric pressure or high air temperature, the intake air density decreases.

FIG. 20 shows a state of generated torque which changes with the intake air density with the same throttle valve opening angle. With a large intake air density, a larger air volume can be suctioned; with a small intake air density, the intake air volume decreases. As a result, the generated torque changes as shown in FIG. 20. Here, if the throttle valve opening angle is increased with decreasing air density, the same generated torque can be ensured at the same ignition timing. However, increasing the throttle valve opening angle may cause the above-mentioned rebound. Further, a required value of throttle valve opening angle corresponding to a required air volume may exceed full opening. In this case, with the idling torque shown by the dashed line of FIG. 21 with the same throttle valve opening angle maintained, measures can be taken by advancing the ignition timing from A to B so as to maintain the idling torque.

In FIG. 21, the intake air density presumption unit 275j presumes an intake air density from the atmospheric pressure and intake air temperature. Specifically, the intake air density presumption unit 275j calculates the density using a gas state equation, map retrieval from the atmospheric pressure and intake air temperature, and the like.

The divider 275k obtains the ratio of the intake air density to the reference air density. This processing makes it possible to obtain the air density ratio which is equivalent to the torque reduction rate.

The ignition timing correction quantity calculation unit 275m obtains an ignition timing correction quantity through table search in relation to the torque reduction rate. The ignition timing correction quantity may be set based on a relation between the ignition timing and the generated torque. Based on the ignition timing correction quantity obtained in this way, the ignition timing correction quantity calculation unit 275m corrects the ignition timing obtained by the ignition timing calculation unit 270 of FIG. 15 to operate the ignition timing. This processing can correct the ignition timing from A to B shown in FIG. 20 in relation to the intake air density.

The following explains additional processing by the target combustion mode determination unit 230 used for the engine control apparatus according to the present embodiment with reference to FIGS. 22A to 22E.

FIGS. 22A to 22E are timing charts showing additional processing by the target combustion mode determination unit used for the engine control apparatus according to an embodiment of the present invention.

As shown in FIG. 4, the combustion mode for catalyst warm-up requires a high filling efficiency of the engine. However, with a high filling efficiency, the intake pipe pressure of the engine is high resulting in the dissociation from the vacuum side. On the other hand, a device operating on the negative pressure of the intake pipe of the engine is used for a vehicle in many cases. For example, a brake pedal force multiplier operates on the negative pressure of the intake pipe in many cases. The brake pedal force multiplier accumulates a negative pressure in its accumulator, and consumes the energy of negative pressure gas to multiply the braking force when the brake is actuated. After the brake is actuated, the brake pedal force multiplier supplies the negative pressure from the intake pipe to prepare for subsequent brake actuation. Therefore, if a sufficient negative pressure is not accumulated in the accumulator of the brake pedal force multiplier, the brake may not be sufficiently actuated.

In order to avoid this state, a state where a sufficient negative pressure is accumulated in the accumulator of the brake pedal force multiplier is added to the conditions for entering the combustion mode for catalyst warm-up. This processing belongs to the target combustion mode determination unit 230 in FIG. 15. When a negative pressure is ensured, the combustion mode is enabled; otherwise, the combustion mode is disabled.

Specifically, methods for detecting that a negative pressure is ensured include a method for directly detecting a negative pressure by use of a negative pressure detector provided in the accumulator, a method for detecting the brake actuation state, for example, brake lamp ON/OFF state, to presume the pressure accumulation state, and the like.

FIGS. 22A to 22E show an exemplary operation for performing this processing. FIG. 22A shows the starting mode Mst, and FIG. 22B the combustion mode Mcmb. FIG. 22C' shows the intake air volume Qa, and the upper side of the arrow denotes larger intake air volume. The intake air volume is proportional to the filling efficiency shown in FIG. 3C. FIG. 22D shows the intake pipe pressure Pin, and the upper side of the arrow denotes larger intake pipe pressure. FIG. 22E shows a pressure Pbr in the brake accumulator, and the upper side of the arrow denotes larger pressure in the brake accumulator.

As shown in FIG. 22D, the intake pipe pressure Pin shifts toward the vacuum side in a range from cranking to end of start. Accordingly, as shown in 22E, the pressure Pbr in the brake accumulator introduces the intake pipe pressure and shifts toward the negative pressure side.

At the time point t2-2, a negative pressure in the brake accumulator Pbr is judged to be ensured. At the time point t3, the intake air volume Qa reaches Qa1 that enables double injection, and intake-compression stroke injection is enabled and combustion mode changeover performed.

When the pressure in the brake accumulator shifts by brake operation toward the atmospheric pressure side, for example at the time point t3-1 of FIG. 22E, in the fast idle mode, a negative pressure in the brake accumulator is not judged to be ensured. At the time point t3-2, the combustion mode is changed from the intake-compression stroke injection mode to the intake stroke injection mode although catalyst warm-up has not completed. This operation ensures a negative pressure in the brake accumulator during engine operation, thus avoiding brake actuation failure.

Although methods for ensuring a negative pressure for the brake system have been explained above, a device operating on the negative pressure of the intake pipe can also ensure operations with similar processing.

The following explains second additional processing by the target combustion mode determination unit 230 used for the engine control apparatus according to the present embodiment with reference to FIGS. 23A to 23D.

FIGS. 23A to 23D are timing charts showing second additional processing by the target combustion mode determination unit used for the engine control apparatus according to an embodiment of the present invention.

Since the combustion mode of the present embodiment is attained by forming an air-fuel mixture distribution in the combustion chamber as explained in FIG. 4 or the like, the form of fuel injection from the injector is an essential requirement to obtain combustion. Here, the fuel pressure on an upstream side of the injector largely affects the form of fuel injection. Therefore, in order to generate a desired air-fuel mixture distribution, a state where the fuel pressure is within a desired range may be a requirement to obtain combustion.

On the other hand, the fuel pressure is raised by a fuel pump that directly or indirectly operates on the engine power and then supplied to the injector in many cases. Therefore, while the engine is in a stop, the fuel pump is stopped and the accumulated high fuel pressure decreases with leak factors at many places. Therefore, the fuel pressure will have decreased by the time of engine start-up in many cases. Therefore, upon engine start-up, the low fuel pressure is gradually increased to a high fuel pressure by pump's work in many cases. Even during engine operation, the fuel pressure may deviate from a desired fuel pressure range because of failure of the fuel pump or its controller or abnormal fuel pressure control.

In this case, a state where the fuel pressure is within a predetermined range is added to the conditions for entering the combustion mode for catalyst warm-up. It is preferable that this processing be configured like a requirement for ensuring a negative pressure for the brake system. Specifically, this processing belongs to the target combustion mode determination unit 230 in FIG. 15. When a negative pressure is ensured, the combustion mode is enabled; otherwise, the combustion mode is disabled.

FIGS. 23A to 23D show an exemplary operation for performing this processing. FIG. 23A shows the starting mode Mst, and FIG. 23B the combustion mode Mcmb. FIG. 23C' shows the intake air volume Qa, and the upper side of the arrow denotes larger intake air volume. The intake air volume is proportional to the filling efficiency shown in FIG. 3C. FIG. 23D shows the fuel pressure Pfu, and the upper side of the arrow denotes larger fuel pressure.

As shown in FIG. 23D, the engine rotational speed is low and therefore the fuel pressure Pfu increases at a low response rate in the cranking mode, and proceeds to the target range at a high response rate at the end of the start-up mode.

At the time point t2-3, the fuel pressure is judged to be within a predetermined range. At the time point t3, the combustion mode is changed to the intake-compression stroke injection mode.

If the fuel pressure decreases by fuel pump failure, the fuel pressure is judged to be out of a predetermined range at the time point t3-3. At this timing, the intake-compression stroke injection mode is disabled although catalyst warm-up has not completed. At the time point t3-4, the combustion mode is changed to the intake stroke injection mode.

This operation prevents the combustion mode for catalyst warm-up from being entered if the fuel pressure is not within a desired range and combustion is not obtained.

The following explains additional processing by the torque distribution unit 265 used for the engine control apparatus according to the present embodiment with reference to FIGS. 24A to 24E.

FIGS. 24A to 24E are timing charts showing additional processing by the torque distribution unit used for the engine control apparatus according to an embodiment of the present invention.

Although an example for finely controlling generated engine torque to a desired value according to the intake air volume has been explained above, it is preferable to suitably set the accuracy of ignition timing operation in relation to a required accuracy of generated engine torque, and suitably design ignition timing calculation processing according to the set accuracy.

FIGS. 24A to 24E show an exemplary operation for performing this processing. FIG. 24A shows the starting mode Mst, and FIG. 24B the combustion mode Mcmb. FIG. 24C' shows the intake air volume Qa, and the upper side of the arrow denotes larger intake air volume. The intake air volume is proportional to the filling efficiency shown in FIG. 3C. FIG. 24D shows the fuel injection quantity Qinj, and the upper side of the arrow denotes larger fuel injection quantity. FIG. 24E shows an ignition timing Tmg-ign, and the upper side of the arrow denotes the advance side of ignition timing.

Various examples of forms for retarding the ignition timing are shown by the solid line, dashed line, and chain line in FIG. 24E.

With the example of the solid line, when execution of combustion mode changeover is determined, the target intake air volume is changed and at the same time the ignition timing is collectively retarded up to a predetermined value. When intake-compression stroke injection is judged to be possible, the combustion mode is changed and at the same time the ignition timing is further retarded up to a steady value in the intake-compression stroke injection mode.

With the example of the dashed line, when execution of combustion mode changeover is determined, the target intake air volume is changed and at the same time the ignition timing is gradually retarded at a predetermined change rate. When intake-compression stroke injection is judged to be possible, the combustion mode is changed and at the same time the ignition timing is gradually retarded at a similar change rate up to a steady value in the intake-compression stroke injection mode.

With the example of the chain line, when execution of combustion mode changeover is determined, the target intake air volume is changed and at the same time the ignition timing is collectively retarded up to a predetermined value. When intake-compression stroke injection is judged to be possible, the ignition timing is further collectively retarded to a predetermined time and a predetermined value so as to reach a steady value afterwards in the intake-compression stroke injection mode.

Although not shown, a similar operation is possible also in changeover from the intake-compression stroke injection mode to the intake stroke injection mode.

Although a method for calculating ignition timing for performing this processing will not be specifically explained, it is preferable to suitably design relevant processing based on time, change rate setting, and the like.

In either case, the ignition timing is manipulated so as to restrain torque fluctuations accompanying combustion mode changeover before and after combustion mode changeover so that the combustion mode is changed at a time point where fuel injection can be performed twice.

The following explains second additional processing by the torque distribution unit 265 used for the engine control apparatus according to the present embodiment with reference to FIGS. 25A to 25E.

FIGS. 25A to 25E are timing charts showing second additional processing by the torque distribution unit used for the engine control apparatus according to an embodiment of the present invention.

An example for changing the target intake air volume stepwise simultaneously with the judgment of combustion mode changeover has been explained above. If it is difficult to ensure the accuracy of cylinder flow-in air volume presumption or if requirements for generated torque fluctuations are severe, the changeover of the target intake air volume is moderated to ensure the accuracy of cylinder flow-in air volume presumption and restrain generated torque fluctuations.

FIGS. 25A to 25E show an exemplary operation for performing this processing. FIG. 25A shows the starting mode Mst, and FIG. 25B the combustion mode Mcmb. FIG. 25C' shows the intake air volume Qa, and the upper side of the arrow denotes larger intake air volume. The intake air volume is proportional to the filling efficiency shown in FIG. 3C. FIG. 25D shows the fuel injection quantity Qinj, and the upper side of the arrow denotes larger fuel injection quantity. FIG. 25E shows an ignition timing Tmg-ign, and the upper side of the arrow denotes the advance side of ignition timing.

At the time point t2, the combustion mode changeover is determined. As shown by the chain line of FIG. 25C', the target intake air volume is gradually changed at a predetermined change rate toward a steady target value in the intake-compression stroke injection mode. Therefore, as shown by the solid line of FIG. 25C', the response of the actual intake air volume is moderated resulting in a smaller change per unit time in comparison with that of FIG. 9C'. Therefore, the accuracy of intake air volume presumption can be improved, making it possible to obtain calculation results of ignition timing operation quantity which reflect actual conditions to more extent. As a result, generated torque fluctuations can also be restrained with sufficient accuracy.

Although a method for changing the combustion mode between the intake stroke injection or compression stroke injection mode and the compression-expansion stroke injection or intake-compression stroke injection mode when a required fuel quantity can be injected by the injector while restraining generated torque fluctuations has been explained above, the fuel injection timing according to the present invention is not limited to this stroke, nor the changeover of the number of fuel injections for each combustion be limited to the changeover between single and double injections. Specifically, the present invention is generally effective for a case where the fuel injection quantity from the injector for each combustion is limited during combustion mode changeover in which the number of fuel injections for each combustion is changed.

Although an engine which directly injects fuel into the combustion chamber has been explained above, the present invention is applicable also to an engine which injects fuel into the intake port, wherein ignition timing retarding operation is performed, fuel injection is performed plural times for each combustion upon retarding combustion, and fuel injection is performed a fewer number of times upon other combustions.

In accordance with the present invention, as mentioned above, the fuel injection quantity in each injection can exceed the minimum injectable fuel quantity for each injection in each combustion mode, thus enabling injection pattern changeover in an engine operating state where fuel injection can be performed a plurality number of times.

What is claimed is:

1. An engine control apparatus for an engine having an injector in each cylinder to perform fuel injection from the injector a predetermined number of times for each cylinder combustion, for controlling the timing of fuel injection from the injector and the ignition timing,
   wherein the engine control apparatus provides control means which, upon combustion mode changeover from a first combustion mode in which fuel injection is performed at least once for each cylinder combustion to a second combustion mode in which fuel injection is performed a greater number of times with a larger intake air volume than the first combustion mode, performs the steps of changing, in the first combustion mode, to a target intake air volume required in the second combustion mode; retarding the ignition timing; changing to the second combustion mode; and further retarding the ignition timing.

2. The engine control apparatus according to claim 1, wherein:
   the control means selects the second combustion mode upon catalyst warm-up after the engine is started up.

3. The engine control apparatus according to claim 2, wherein:
   the first combustion mode is the compression stroke injection mode in which fuel injection is performed once in the compression stroke for each cylinder combustion; and
   the second combustion mode is the intake-compression stroke injection mode in which fuel injection is performed once in the intake stroke and once in the compression stroke for each cylinder combustion;
   wherein the control means includes:
   target combustion mode determination means for changing the target combustion mode, after complete explosion upon engine start-up, from the compression stroke injection mode to the intake-compression stroke injection mode in which fuel injection is performed once in the intake stroke and once in the compression stroke for each cylinder combustion; and further changing the target combustion mode, for catalyst warm-up, to the compression-expansion stroke injection mode in which fuel injection is performed once in the compression stroke and once in the expansion stroke for each cylinder combustion;
   target throttle valve opening angle calculation means for calculating and outputting an increasing target throttle valve opening angle so that a target air volume suitable for the intake-compression stroke injection and compression-expansion stroke injection modes is suctioned upon combustion mode changeover from the compression stroke injection mode to the intake-compression stroke injection and then to the compression-expansion stroke injection mode by the target combustion mode determination means;

actual air volume presumptive calculation means for performing presumptive calculation of an actual air volume that changes with a response delay with respect to the motion of a throttle valve controlled based on the target throttle valve opening angle output by the target throttle valve opening angle calculation means;

actual combustion mode determination means for determining an actual combustion mode in relation to the target combustion mode determined by the target combustion mode determination means based on the actual air volume calculated by the actual air volume presumptive calculation means; and a control condition calculation means for calculating control conditions composed of a target equivalent ratio, fuel injection timing, and ignition timing for the actual combustion mode determined by the actual combustion mode determination means;

wherein the actual combustion mode determination means maintains the compression stroke injection mode until the actual air volume calculated by the actual air volume presumptive calculation means reaches an air volume that can be combusted in the intake-compression stroke injection mode;

wherein the control condition calculation means outputs an ignition timing retard to the injector and spark plug as a control condition such that the fuel injection quantity which increases with increasing actual air volume, presumed by the actual air volume presumptive calculation means, with a response delay with respect to the target air volume, and output engine torque which increases with increasing fuel injection quantity are suitable for target torque;

wherein the actual combustion mode determination means changes the actual combustion mode to the intake-compression stroke injection mode when the actual air volume calculated by the actual air volume presumptive calculation means reaches an air volume that can be combusted in the intake-compression stroke injection mode;

wherein the control condition calculation means outputs a further ignition timing retard to the injector and spark plug as a control condition such that the fuel injection quantity which increases with increasing actual air volume, presumed by the actual air volume presumptive calculation means, with a response delay, and output engine torque which increases with increasing fuel injection quantity are suitable for target torque;

wherein the actual combustion mode determination means changes the actual combustion mode to the compression-expansion stroke injection mode when the actual air volume calculated by the actual air volume presumptive calculation means reaches an air volume that is combustible in the compression-expansion stroke injection mode; and wherein the control condition calculation means outputs a further ignition timing retard to the injector and spark plug as a control condition such that the fuel injection quantity which increases with increasing actual air volume, presumed by the actual air volume presumptive calculation means, with a response delay, and output engine torque which increases with increasing fuel injection quantity are suitable for target torque.

4. The engine control apparatus according to claim 2, wherein:
the first combustion mode is the compression stroke injection mode in which fuel injection is performed once in the compression stroke for each cylinder combustion; and
the second combustion mode is the intake-compression stroke injection mode in which fuel injection is performed once in the intake stroke and once in the compression stroke for each cylinder combustion;
wherein the control means includes:
target combustion mode determination means for changing the target combustion mode, after complete explosion upon engine start-up, from the compression stroke injection mode to the compression-expansion stroke injection mode in which fuel injection is performed once in the compression stroke and once in the expansion stroke for each cylinder combustion;
target throttle valve opening angle calculation means for calculating and outputting an increasing target throttle valve opening angle so that a target air volume suitable for the intake-compression stroke injection mode is suctioned upon combustion mode changeover from the compression stroke injection mode to the intake-compression stroke injection mode by the target combustion mode determination means;
actual air volume presumptive calculation means for performing presumptive calculation of an actual air volume that changes with a response delay with respect to the motion of a throttle valve controlled based on the target throttle valve opening angle output by the target throttle valve opening angle calculation means;
actual combustion mode determination means for determining an actual combustion mode in relation to the target combustion mode determined by the target combustion mode determination means based on the actual air volume calculated by the actual air volume presumptive calculation means; and
a control condition calculation means for calculating control conditions composed of a target equivalent ratio, fuel injection timing, and ignition timing for the actual combustion mode determined by the actual combustion mode determination means;
wherein the actual combustion mode determination means maintains the compression stroke injection mode until the actual air volume calculated by the actual air volume presumptive calculation means reaches an air volume that is combustible in the intake-compression stroke injection mode;
wherein the control condition calculation means outputs an ignition timing retard to the injector and spark plug as a control condition such that the fuel injection quantity which increases with increasing actual air volume, presumed by the actual air volume presumptive calculation means, with a response delay with respect to the target air volume, and output engine torque which increases with increasing fuel injection quantity are suitable for target torque;
wherein the actual combustion mode determination means changes the actual combustion mode to the intake-compression stroke injection mode when the actual air volume calculated by the actual air volume presumptive calculation means reaches an air volume that can be combusted in the intake-compression stroke injection mode; and
wherein the control condition calculation means outputs a further ignition timing retard to the injector and spark plug as a control condition such that the fuel injection quantity which increases with increasing actual air volume, presumed by the actual air volume presumptive calculation means, with a response delay, and output engine torque which increases with increasing fuel injection quantity are suitable for target torque.

5. The engine control apparatus according to claim 4, wherein:
the control means controls the engine in the second combustion mode when a negative pressure is induced at a mechanism that operates on a negative pressure of an intake pipe.

6. The engine control apparatus according to claim 4, wherein:
the control means controls the engine in the second combustion mode when a pressure of a fuel supply system is sufficient to perform the second combustion mode.

7. The engine control apparatus according to claim 4, wherein:
the target throttle valve opening angle calculation means gradually changes the target intake air volume toward a final target value.

8. The engine control apparatus according to claim 4, wherein:
the control condition operation means corrects the ignition timing of the second combustion mode in relation to the intake air density of the engine.

* * * * *